(12) United States Patent
Suryanarayanan et al.

(10) Patent No.: US 10,686,646 B1
(45) Date of Patent: Jun. 16, 2020

(54) MANAGEMENT OF COMPUTING SESSIONS

(71) Applicant: Amazon Technologies, Inc., Reno, NV (US)

(72) Inventors: Deepak Suryanarayanan, Seattle, WA (US); Eugene Michael Farrell, Sammamish, WA (US); David Everard Brown, Cape Town (ZA); Eric Jason Brandwine, Haymarket, VA (US); Ajit Nagendra Padukone, Bellevue, WA (US); Vivek Lakshmanan, Seattle, WA (US); Colin Harrison Brace, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 940 days.

(21) Appl. No.: 13/928,286

(22) Filed: Jun. 26, 2013

(51) Int. Cl.
*G06F 15/16* (2006.01)
*H04L 29/08* (2006.01)

(52) U.S. Cl.
CPC .............................. *H04L 29/08639* (2013.01)

(58) Field of Classification Search
CPC .................................................. H04L 29/08639
See application file for complete search history.

(56) References Cited

U.S. PATENT DOCUMENTS

| | | |
|---|---|---|
| 4,991,089 A | 2/1991 | Shorter |
| 5,001,628 A | 3/1991 | Johnson et al. |
| 5,948,061 A | 9/1999 | Merriman et al. |
| 6,192,361 B1 | 2/2001 | Huang |
| 6,223,289 B1 | 4/2001 | Wall et al. |
| 6,598,167 B2 | 7/2003 | Devine et al. |
| 6,615,264 B1 | 9/2003 | Stoltz et al. |
| 6,785,894 B1 | 8/2004 | Ruberg |
| 6,895,588 B1 | 5/2005 | Ruberg |
| 7,209,945 B2 | 4/2007 | Hicks, III et al. |
| 7,577,722 B1 | 8/2009 | Khandekar et al. |
| 7,716,180 B2 | 5/2010 | Vermeulen et al. |

(Continued)

FOREIGN PATENT DOCUMENTS

| | | |
|---|---|---|
| CN | 101964860 A | 2/2011 |
| EP | 2 357 558 A2 | 8/2011 |

(Continued)

OTHER PUBLICATIONS

Dropbox-Features-Dropbox for Teams, available at http://www.dopbox.com/teams/features, last accessed on Mar. 29, 2013.

(Continued)

*Primary Examiner* — Ryan J Jakovac
(74) *Attorney, Agent, or Firm* — Knobbe, Martens, Olson & Bear, LLP

(57) ABSTRACT

A remote computing session management process is directed to the execution and management of aspects of virtual instances executed on data center computers at a program execution service (PES) platform. A computing session may be established between the PES platform and a computing device connected to the PES platform over a communications network. The data created by the user of the client computing device interacting with the virtual instance may be stored, and following an interruption of the remote computing session, the data may be used when re-establishing the remote computing session.

23 Claims, 11 Drawing Sheets

(56) References Cited

U.S. PATENT DOCUMENTS

| | | |
|---|---|---|
| 7,865,586 B2 | 1/2011 | Cohn |
| 7,944,948 B2 | 5/2011 | Chow et al. |
| 7,953,865 B1 | 5/2011 | Miller et al. |
| 7,991,859 B1 | 8/2011 | Miller et al. |
| 8,090,877 B2 | 1/2012 | Agarwal et al. |
| 8,151,323 B2 | 4/2012 | Harris et al. |
| 8,155,155 B1 | 4/2012 | Chow et al. |
| 8,180,908 B2 | 5/2012 | Zoller et al. |
| 8,181,206 B2 | 5/2012 | Hasek |
| 8,200,773 B2 | 6/2012 | Bluestone et al. |
| 8,201,237 B1 | 6/2012 | Doane et al. |
| 8,370,938 B1 | 2/2013 | Daswani et al. |
| 8,386,757 B1 | 2/2013 | Midgley et al. |
| 8,443,367 B1 | 5/2013 | Taylor et al. |
| 8,566,447 B2 | 10/2013 | Cohen et al. |
| 8,756,293 B2 | 6/2014 | Duggal |
| 8,848,608 B1 | 9/2014 | Addepalli et al. |
| 8,904,081 B1 | 12/2014 | Kulkarni |
| 8,918,392 B1 | 12/2014 | Brooker et al. |
| 9,002,982 B2 | 4/2015 | Suryanarayanan et al. |
| 9,060,239 B1 | 6/2015 | Sihna et al. |
| 9,063,756 B2 | 6/2015 | Ben-Shaul et al. |
| 9,110,600 B1 | 8/2015 | Brooker et al. |
| 9,143,529 B2 | 9/2015 | Qureshi et al. |
| 9,148,350 B1 | 9/2015 | Suryanarayanan et al. |
| 9,183,380 B2 | 11/2015 | Qureshi et al. |
| 9,369,433 B1 | 6/2016 | Paul et al. |
| 2001/0011254 A1 | 8/2001 | Clark |
| 2002/0046300 A1 | 4/2002 | Hanko et al. |
| 2002/0133529 A1 | 9/2002 | Schmidt |
| 2002/0138763 A1 | 9/2002 | Delany et al. |
| 2002/0169876 A1 | 11/2002 | Curie et al. |
| 2003/0078965 A1 | 4/2003 | Cocotis et al. |
| 2003/0079030 A1 | 4/2003 | Cocotis et al. |
| 2003/0200295 A1 | 10/2003 | Roberts et al. |
| 2006/0026103 A1 | 2/2006 | Lee |
| 2006/0031529 A1 | 2/2006 | Keith, Jr. |
| 2007/0136195 A1 | 6/2007 | Banjo |
| 2007/0174410 A1 | 7/2007 | Croft et al. |
| 2007/0245409 A1 | 10/2007 | Harris et al. |
| 2007/0255814 A1 | 11/2007 | Green et al. |
| 2007/0291739 A1 | 12/2007 | Sullivan et al. |
| 2008/0046993 A1 | 2/2008 | Mullick et al. |
| 2008/0049786 A1 | 2/2008 | Ram et al. |
| 2008/0098006 A1 | 4/2008 | Pedersen et al. |
| 2008/0119207 A1 | 5/2008 | Harris |
| 2008/0184128 A1 | 7/2008 | Swenson et al. |
| 2008/0189468 A1 | 8/2008 | Schmidt et al. |
| 2008/0244743 A1 | 10/2008 | Largman et al. |
| 2009/0024853 A1 | 1/2009 | Yeap et al. |
| 2009/0055693 A1 | 2/2009 | Budko et al. |
| 2009/0083376 A1 | 3/2009 | Dowlmg et al. |
| 2009/0216975 A1* | 8/2009 | Halperin ............ G06F 9/45537 |
| | | 718/1 |
| 2009/0241110 A1 | 9/2009 | Heo et al. |
| 2009/0248869 A1 | 10/2009 | Ghostine |
| 2009/0260007 A1 | 10/2009 | Beaty et al. |
| 2009/0276771 A1 | 11/2009 | Nickolov et al. |
| 2009/0288084 A1 | 11/2009 | Astete et al. |
| 2010/0030881 A1 | 2/2010 | Moreira Sa de Souza et al. |
| 2010/0058347 A1 | 3/2010 | Smith et al. |
| 2010/0107113 A1 | 4/2010 | Innes et al. |
| 2010/0107225 A1 | 4/2010 | Spencer et al. |
| 2010/0110919 A1 | 5/2010 | Hischke et al. |
| 2010/0121975 A1 | 5/2010 | Sinha et al. |
| 2010/0131654 A1 | 5/2010 | Malakapalli et al. |
| 2010/0153955 A1 | 6/2010 | Sirota et al. |
| 2010/0180293 A1 | 7/2010 | Brown et al. |
| 2010/0185583 A1* | 7/2010 | Berinde ............ G06F 11/1461 |
| | | 707/610 |
| 2010/0198972 A1 | 8/2010 | Umbehocker |
| 2010/0218106 A1 | 8/2010 | Chen et al. |
| 2010/0241731 A1 | 9/2010 | Du et al. |
| 2011/0004649 A1 | 1/2011 | Nord et al. |
| 2011/0022812 A1 | 1/2011 | van der Linden et al. |
| 2011/0053513 A1 | 3/2011 | Papakostas et al. |
| 2011/0055850 A1 | 3/2011 | Williamson |
| 2011/0178946 A1 | 7/2011 | Minert et al. |
| 2011/0184993 A1 | 7/2011 | Chawla et al. |
| 2011/0185355 A1* | 7/2011 | Chawla ............ G06F 9/5077 |
| | | 718/1 |
| 2011/0191492 A1 | 8/2011 | Imai |
| 2011/0209064 A1 | 8/2011 | Jorgensen et al. |
| 2011/0225578 A1 | 9/2011 | Lauwers et al. |
| 2011/0231844 A1* | 9/2011 | Ben-Shaul et al. ............ 718/1 |
| 2011/0246904 A1 | 10/2011 | Pinto et al. |
| 2011/0252071 A1* | 10/2011 | Cidon .................... 707/802 |
| 2011/0292792 A1 | 12/2011 | Zuo et al. |
| 2012/0041970 A1 | 2/2012 | Ghosh et al. |
| 2012/0069131 A1 | 3/2012 | Abelow |
| 2012/0072762 A1 | 3/2012 | Atchison et al. |
| 2012/0089572 A1* | 4/2012 | Raichstein et al. ........... 707/645 |
| 2012/0096271 A1 | 4/2012 | Ramarathinam et al. |
| 2012/0124194 A1 | 5/2012 | Shouraboura |
| 2012/0131129 A1 | 5/2012 | Agarwal et al. |
| 2012/0143944 A1 | 6/2012 | Reeves et al. |
| 2012/0166967 A1 | 6/2012 | Deimbacher et al. |
| 2012/0179820 A1 | 7/2012 | Ringdahl et al. |
| 2012/0204060 A1 | 8/2012 | Swift et al. |
| 2012/0216015 A1 | 8/2012 | Mitra |
| 2012/0226742 A1 | 9/2012 | Momchilov et al. |
| 2012/0239792 A1 | 9/2012 | Banerjee et al. |
| 2012/0260248 A1 | 10/2012 | Katiyar et al. |
| 2012/0297181 A1 | 11/2012 | Lee |
| 2012/0304168 A1 | 11/2012 | Raj Seeniraj et al. |
| 2012/0311157 A1 | 12/2012 | Erickson et al. |
| 2012/0317295 A1 | 12/2012 | Baird et al. |
| 2012/0324469 A1 | 12/2012 | Nishihara et al. |
| 2012/0331406 A1 | 12/2012 | Baird et al. |
| 2013/0006808 A1 | 1/2013 | Kassaei |
| 2013/0013738 A1 | 1/2013 | Astete et al. |
| 2013/0018939 A1 | 1/2013 | Chawla et al. |
| 2013/0060946 A1 | 3/2013 | Kenneth et al. |
| 2013/0073703 A1* | 3/2013 | Das et al. .................. 709/223 |
| 2013/0091334 A1* | 4/2013 | Yu et al. .................. 711/162 |
| 2013/0097601 A1 | 4/2013 | Podvratnik et al. |
| 2013/0125122 A1 | 5/2013 | Hansen |
| 2013/0132545 A1 | 5/2013 | Schultze et al. |
| 2013/0198318 A1 | 8/2013 | Branson et al. |
| 2013/0201909 A1 | 8/2013 | Bosch et al. |
| 2013/0212161 A1 | 8/2013 | Ben-Shaul et al. |
| 2013/0219043 A1 | 8/2013 | Steiner et al. |
| 2013/0275966 A1 | 10/2013 | Harper et al. |
| 2013/0283263 A1 | 10/2013 | Elemary |
| 2013/0283289 A1 | 10/2013 | Adinarayan et al. |
| 2013/0297680 A1 | 11/2013 | Smith et al. |
| 2013/0298210 A1 | 11/2013 | Wright et al. |
| 2013/0318522 A1 | 11/2013 | Devireddy et al. |
| 2013/0326515 A1 | 12/2013 | Hara et al. |
| 2014/0095816 A1 | 4/2014 | Hsu et al. |
| 2014/0149490 A1 | 5/2014 | Luxenberg et al. |
| 2014/0149591 A1 | 5/2014 | Bhattacharya et al. |
| 2014/0188977 A1 | 7/2014 | Song et al. |
| 2014/0207835 A1 | 7/2014 | Jellick et al. |
| 2014/0237070 A1 | 8/2014 | Choi et al. |
| 2014/0250232 A1 | 9/2014 | Liu et al. |
| 2014/0258155 A1 | 9/2014 | Suryanarayanan |
| 2014/0258374 A1 | 9/2014 | Suryanarayanan |
| 2014/0258450 A1 | 9/2014 | Suryanarayanan |
| 2014/0280436 A1 | 9/2014 | Larkin et al. |
| 2014/0297866 A1 | 10/2014 | Ennaji et al. |
| 2014/0337836 A1 | 11/2014 | Ismael |
| 2014/0351822 A1 | 11/2014 | Jandir et al. |
| 2014/0359613 A1 | 12/2014 | Tsirkin |
| 2015/0006614 A1 | 1/2015 | Suryanarayanan et al. |
| 2015/0019704 A1 | 1/2015 | Suryanarayanan |
| 2015/0019705 A1 | 1/2015 | Suryanarayanan |
| 2015/0019728 A1 | 1/2015 | Suryanarayanan |
| 2015/0019733 A1 | 1/2015 | Suryanarayanan |
| 2015/0143366 A1 | 5/2015 | Suragi Math et al. |
| 2015/0201009 A1 | 7/2015 | Suryanarayanan |
| 2015/0356113 A1 | 12/2015 | Suryanarayanan |
| 2016/0021149 A1 | 1/2016 | Maistri |
| 2016/0191410 A1 | 6/2016 | Suryanarayanan |

(56) References Cited

U.S. PATENT DOCUMENTS

FOREIGN PATENT DOCUMENTS

| | | |
|---|---|---|
| EP | 2 442 226 A1 | 4/2012 |
| EP | 2 972 838 | 1/2016 |
| EP | 2 972 963 | 1/2016 |
| EP | 2 972 964 | 1/2016 |
| JP | 2002-007329 A | 1/2002 |
| JP | 2002-140532 A | 5/2002 |
| JP | 2004-062443 A | 2/2004 |
| JP | 2006-099429 A | 4/2006 |
| JP | 2008-542871 A | 11/2008 |
| JP | 2009-525531 A | 7/2009 |
| JP | 2011-248419 A | 12/2011 |
| JP | 2012-168585 A | 9/2012 |
| KR | 2012-0096741 A | 8/2012 |
| WO | WO 2006/130170 A2 | 12/2006 |
| WO | WO 2007/089283 A1 | 8/2007 |
| WO | WO 2008/087085 A3 | 7/2008 |
| WO | WO 2011/030755 A1 | 3/2011 |
| WO | WO 2011/094301 A1 | 8/2011 |
| WO | WO 2012/050720 A2 | 4/2012 |
| WO | WO 2012/088363 A2 | 6/2012 |
| WO | WO 2013/006157 | 1/2013 |
| WO | WO 2014/164075 | 10/2014 |
| WO | WO 2014/164076 | 10/2014 |
| WO | WO 2014/164119 | 10/2014 |
| WO | WO 2014/210169 | 12/2014 |
| WO | WO 2014/210172 | 12/2014 |
| WO | WO 2014/210175 | 12/2014 |
| WO | WO 2014/210181 | 12/2014 |
| WO | WO 2014/210187 | 12/2014 |

OTHER PUBLICATIONS

How Virtual Desktops Work, available at http://www.turnkeydesk.com/how-virtual-desktops-work.php, last accessed on Mar. 29, 2013.
Hosted Virtual Desktop /Desktop Virtualization/Cloud My Office, available at http://www.cloudmyoffice.com/hosted-virtual-desktop-features, last accessed on Mar. 29, 2013.
U.S. Appl. No. 13/246,662, filed Sep. 27, 2011, titled "User Agent Information Management", in 66 pages.
U.S. Appl. No. 13/794,490, filed Mar. 11, 2013, titled "Automated Desktop Placement", in 77 pages.
U.S. Appl. No. 13/794,600, filed Mar. 11, 2013, titled "Application Marketplace for Virtual Desktops", in 76 pages.
U.S. Appl. No. 13/794,595, filed Mar. 11, 2013, titled "Automated Data Center Selection", in 77 pages.
U.S. Appl. No. 13/794,515, filed Mar. 11, 2013, titled "Automated Data Synchronization", in 77 pages.
U.S. Appl. No. 13/928,284, filed Jun. 26, 2013, titled "Management of Computing Sessions", in 50 pages.
U.S. Appl. No. 13/928,295, filed Jun. 26, 2013, titled Management of Computing Sessions, in 51 pages.
U.S. Appl. No. 13/928,290, filed Jun. 26, 2013, titled Management of Computing Sessions, in 50 pages.
U.S. Appl. No. 13/928,278 filed Jun. 26, 2013, titled Management of Computing Sessions, in 51 pages.
U.S. Appl. No. 13/928,283, filed Jun. 26, 2013, titled Management of Computing Sessions, in 51 pages.
Search Report and Written Opinion received in International Application No. PCT/US2014/020655, dated Jul. 24, 2014.
Search Report and Written Opinion received in International Application No. PCT/US2014/020404, dated Jul. 18, 2014.
Search Report and Written Opinion received in International Application No. PCT/US2014/020412, dated Jul. 18, 2014.
Search Report and Written Opinion received in International Application No. PCT/US14/44121, dated Nov. 14, 2014.
Search Report and Written Opinion received in International Application No. PCT/US14/44124, dated Oct. 30, 2014.
Search Report and Written Opinion received in International Application No. PCT/US14/44117, dated Oct. 31, 2014.
Search Report and Written Opinion received in International Application No. PCT/14/44137, dated Oct. 14, 2014.
Search Report and Written Opinion received in International Application No. PCT/14/44131, dated Oct. 14, 2014.
Merriam-Webster, definition of "version," 2015.
International Preliminary Report and Written Opinion received in PCT Application No. PCT/US2014/020655, dated Sep. 15, 2015.
International Preliminary Report and Written Opinion received in PCT Application No. PCT/US2014/020404, dated Sep. 15, 2015.
International Preliminary Report and Written Opinion received in PCT Application No. PCT/US2014/020412, dated Sep. 15, 2015.
International Preliminary Report on Patentability received in PCT Application No. PCT/US14/44121, dated Dec. 29, 2015.
International Preliminary Report on Patentability received in PCT Application No. PCT/US14/44124, dated Dec. 29, 2015.
International Preliminary Report on Patentability received in PCT Application No. PCT/US14/44117, dated Dec. 29, 2015.
International Preliminary Report on Patentability received in PCT Application No. PCT/14/44137, dated Dec. 29, 2015.
International Preliminary Report on Patentability received in PCT Application No. PCT/14/44131, dated Dec. 29, 2015.
Office Action dated Sep. 14, 2016, received in Australian Patent Application No. 2014302474.
Office Action dated Sep. 21, 2016, received in Australian Patent Application No. 2014302480.
Office Action dated Sep. 21, 2016, received in Australian Patent Application No. 2014302486.
Office Action dated May 16, 2016, received in Australian Patent Application No. 2014249630.
Office Action dated Jun. 1, 2016, received in Australian Patent Application No. 2014249680.
Office Action dated May 27, 2016, received in Australian Patent Application No. 2014249681.
Office Action dated Jul. 28, 2016, received in Canadian Application No. 2,903,835.
Office Action dated Jun. 30, 2016, received in Canadian Application No. 2,903,992.
Extended Search Report dated Oct. 17, 2016, received in European Application No. 14778537.2.
Extended Search Report dated Oct. 17, 2016, received in European Patent Application No. 14779317.8.
Extended Search Report dated Oct. 10, 2016, received in European Patent Application No. 14778247.8.
Office Action dated Oct. 3, 2016, received in Japanese Patent Application No. 2016-500649.
Office Action dated Oct. 31, 2016, received in Japanese Patent Application No. 2016-500612.
Office Action dated Oct. 27, 2016, received in Japanese Patent Application No. 2016-500614.
Office Action dated Aug. 22, 2016, received in Korean Patent Application No. 10-2015-7028459.
Office Action dated Oct. 19, 2016, received in Korean Patent Application No. 10-2015-7027901.
Office Action dated May 25, 2016, received in Singapore Patent Application No. 11201507125W.
Written Opinion dated Jul. 12, 2016, received in Singapore Patent Application No. 11201507019Q.
Office Action received in Canadian Patent Application No. 2,916,278 dated Nov. 18, 2016.
Office Action received in Australian Patent Application No. 2014302471, dated Sep. 14, 2016.
Extended Search Report received in European Patent Application No. 14817746.2, dated Nov. 28, 2016.
Office Action received in Canadian Patent Application No. 2,916,296, dated Dec. 6, 2016.
Office Action received in Japanese Patent Application No. 2016-523895 dated Nov. 27, 2016.
Office Action received in Australian Patent Application No. 2014249630 dated Oct. 31, 2016.
Office Action received in Australian Patent Application No. 2014249680 dated Nov. 8, 2016.
Written Opinion received in Singapore Patent Application No. 11201507019Q dated Jul. 12, 2016.

(56) References Cited

OTHER PUBLICATIONS

Office Action (Second) received in Australian Patent Application No. 2014249681 dated Dec. 21, 2016.
Laverick, M., et al., Administering Vmware View™ 4.5, Jan. 1, 2010, XP055293809, retrieved from internet http://cdn.ttgtmedia.com/rms/pdf/view4.5-rtfm-guide-GAAE-1.pdf.
Merriam-Webster, "attach", 2016.
Merriam-Webster, "clone", 2016.
Shamma et al., "Capo: Recapitulating Storage for Virtual Desktops," 2011.
Umezawa et al., Development of a Virtual PC Type Thin Client System, Institute of Electronics, Information and Communication Engineers 112(379):97-102, Jan. 2013.
Wikipedia, "clone", 2016.
Wikipedia, "cloning," 2016.
Zhao, et al., "Distributed File System Support for Virtual Machines in Grid Computing," 2004.

* cited by examiner

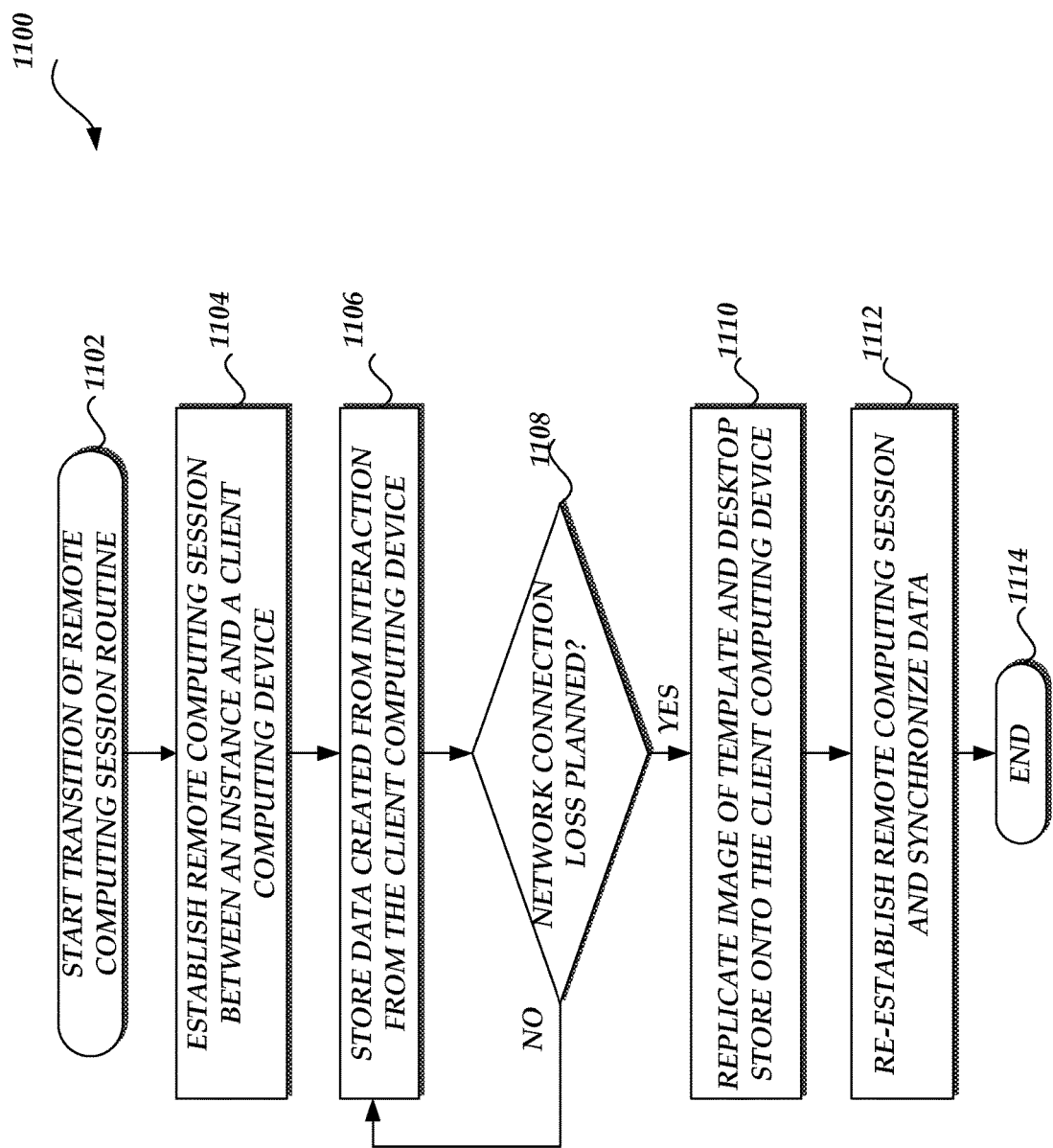

MANAGEMENT OF COMPUTING SESSIONS

BACKGROUND

Data centers of remote network computing providers may house significant numbers of interconnected computing systems to provide computing resources to customers. Such data centers may provide network access, power, hardware resources (e.g., computing and storage), and secure installation facilities for hardware maintained by the data center, an organization, or by another third party.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

The remote network computing providers providing virtual machine resources to their users generally strive to provide such resources with optimum levels of availability, scalability and reliability.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 is a flow diagram illustrative of a routine for the transition of operation of the client computing device and the service provider computer network between remote and local environments.

DETAILED DESCRIPTION

Figure 1:
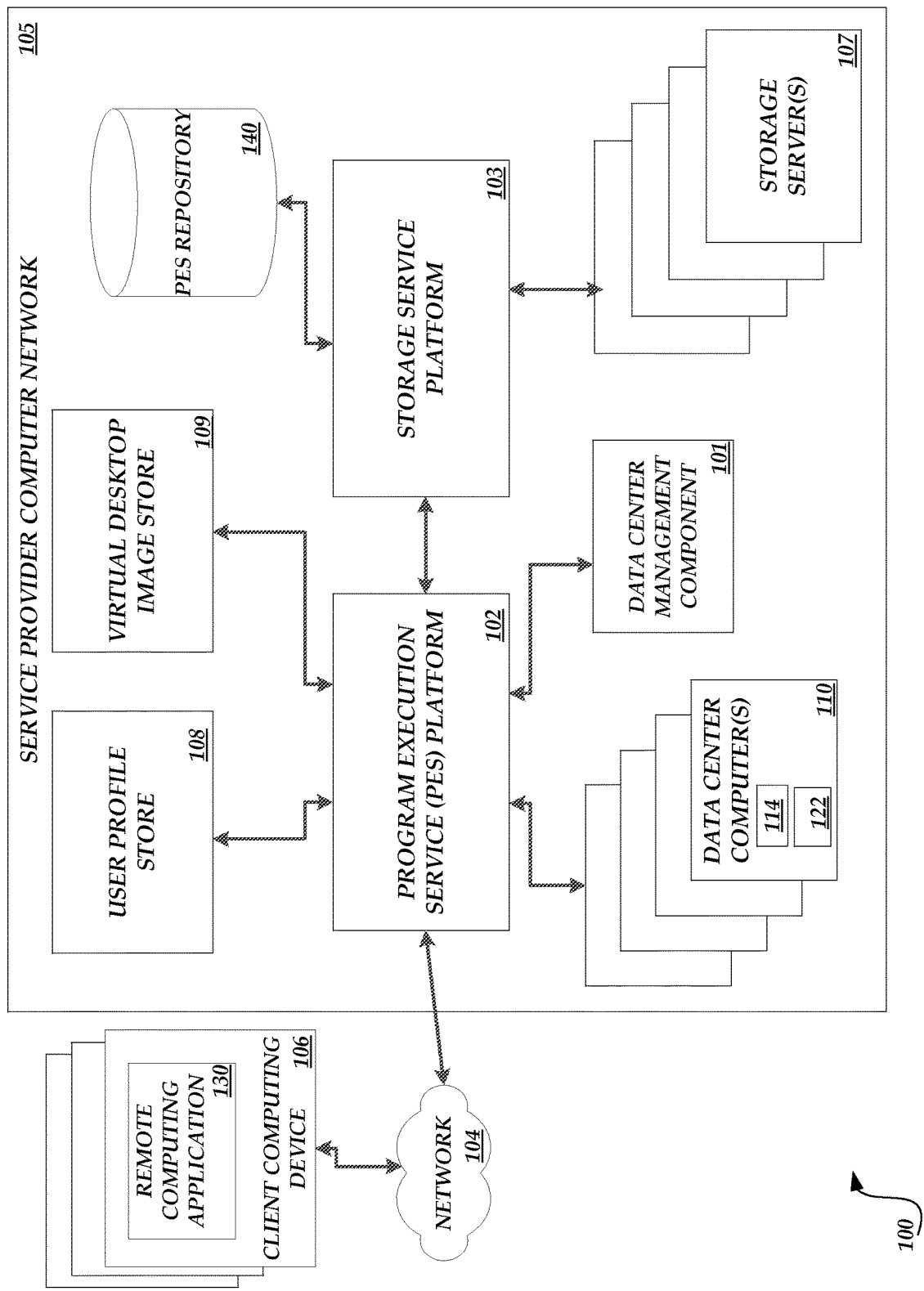
FIG. 1 is a block diagram illustrative of a networked computing environment including a client computing device and a service provider computer network.

Generally described, the present disclosure is directed to the generation and management of a remote computing session between one or more client computing devices and a virtual desktop instance hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers.

Aspects of the disclosure will be described with regard to the management of virtual desktop instances by a PES platform. Client computing devices can access the virtual desktop instances during one or more remote computing sessions. A virtual desktop instance can provide a user with all of the capabilities of a client desktop environment but with centralized provisioning of the services accessed by the client.

With reference to a first illustrative example, a user, via a client computing device, transmits a request to load an application such as a remote computing application. Subsequent to the receipt of the request, the client computing device communicates with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform can instantiate, or cause to have instantiated, a virtual machine instance on a data center computer. The virtual machine instance includes an operating system. The client computing device can then establish a remote computing session with the virtual machine, and the user interface of the operating system (e.g., the output of the operating system such as a graphical user interface, sound, etc.) can be sent to the client computing device and presented to the user (e.g., the graphical user interface is rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity can then be sent to the virtual machine and injected into the operating system as if the activity was performed by a user directly at the virtual machine.

The PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. . . . . By saving the user data, the PES platform ensures that the re-establishment of a remote computing session occurs with minimal delay and disruption to a user of a client computing device.

In another illustrative example, the virtual desktop instance provided may be configured according to a user profile stored at a user profile store of the PES. The configuration of the virtual desktop instance may also be adjusted according to monitored usage of the instance. In some examples, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given access while using the virtual desktop instance. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

In another illustrative example, the PES platform may be used to provide a backup copy of the computing environment of a client computing device on one or more of the data center computers at the PES platform. Subsequently, if the client computing device is compromised, upon starting a new remote computing session with the PES platform, the backup copy of the computing environment of the client computing device originally used may be made available to the user. In the new remote computing session, the user may be connecting to the PES platform from the same or another client computing device.

In yet another illustrative example, the remote computing session between a client computing device and the PES platform may be used to provide a version of the virtual desktop instance to be executed on the client computing device. The version of the instance may be adapted according to one or more of the operating system, the memory and the processing power specifications of the client computing device. With the adapted version of the virtual desktop instance copied onto the client computing device, the device may continue to interact with the virtual desktop instance even after disconnection from the PES platform. Subsequently, upon reconnecting to the PES platform, a new virtual desktop instance may be synchronized with the previous virtual desktop instance executed on the client computing device.

Although aspects of the embodiments described in the disclosure may describe, for the purpose of illustration, the management of one or more remote sessions corresponding to a software application, such as a virtual desktop instance, one skilled in the art will appreciate that the techniques disclosed herein may be applied to any number of software processes including, but not limited to, operating system processes and services. Further, although various aspects of the disclosure will be described with regard to illustrative examples and embodiments, one skilled in the art will appreciate that the disclosed embodiments and examples should not be construed as limiting.

FIG. 1 is a block diagram illustrative of a networked computing environment 100 including a client computing device 106 in communication with a service provider computer network 105 via the communication network 104. The client computing device 106 may be used for providing access to a remote operating system and applications to a user. In an illustrative embodiment, the client computing device 106 can correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In an illustrative embodiment, the client computing device 106 includes necessary hardware and software components for establishing communications over a communication network 104, such as a wide area network or local area network. For example, the client computing device 106 may be equipped with networking equipment and browser software applications that facilitate communications via the Internet or an intranet. The client computing device 106 may have varied local computing resources such as central processing units and architectures, memory, mass storage, graphics processing units, communication network availability and bandwidth, etc.

In one embodiment, the client computing device 106 may run a remote computing application 130. The remote computing application 130 may request access to a virtual desktop instance hosted by the service provider computer network 105. The remote computing application 130 may also manage the remote computing session between the client computing device 106 and the service provider computer network 105. With further continued reference to FIG. 1, the service provider computer network 105 can also include a PES platform 102. The PES platform 102 illustrated in FIG. 1 corresponds to a logical association of one or more data centers associated with a service provider. The PES platform 102 can be associated with a number of data center computers, such as, for example, data center computers 110. Each data center computer 110 may host one or more virtual desktop instances 114. The data center computer 110 may host a virtual desktop instance by executing a virtual machine on a physical device. The virtual machine may execute an instance of an operating system and application software to create a virtual desktop instance. Each virtual desktop instance executed by the PES 102 can be accessed by one or more client computing devices.

Illustratively, data center computers may be associated with private network addresses, such as IP addresses, within the service provider computer network 105 such that they may not be directly accessible by the client computing devices 106. The virtual desktop instances may be associated with public network addresses that may be made available by a gateway at the edge of the service provider computer network 105. Accordingly, the virtual desktop instances may be directly addressable by client computing devices via the public network addresses. One skilled in the relevant art will appreciate that each data center computer 110 would include physical computing device resources and software to execute the multiple virtual desktop instances or to dynamically instantiate virtual desktop instances. Such instantiations can be based on a specific request, such as from the client computing device 106.

The data center computers 110 may include instance managers 122. The instance managers 122 may be on the same computer as the respective instances 114, or on a separate computer. The instance managers 122 track progress of the instances executed on the data center computers 110, monitor and coordinate the storage of data created by the user while interacting with the instances 114 via the client computing devices, and monitor the overall health and state of the data center computers 110 and of the remote computing applications running on the client computing devices 106. The instance managers 122 communicate information collected through tracking and monitoring with the data center management component 101 of the PES platform 102 in order to efficiently manage the various remote computing sessions between the data center computers 110 and the client computing devices 106.

With continued reference to FIG. 1, the service provider network 105 also includes a storage service platform 103. The storage service platform 103 may include, or be connected to, one or more storage servers 107. The storage servers 107 may be used for storing data generated or utilized by the virtual desktop instances. The data generated or utilized by the virtual desktop instances may be based on the interaction between the client computing devices 106 and the PES 102 via one or more remote computing sessions.

Illustratively, the storage service platform 103 can logically organize and maintain information associated with a hosted virtual desktop instance 114 in a desktop store. The information associated with a virtual desktop instance 114 maintained in the desktop store can include, but is not limited to, user preferences, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, is also stored on the desktop store associated with the user's virtual desktop instance. As will be explained in greater detail below, the service provider computer network 105 can mitigate the effect of failures of the data center computer(s) 110 running the virtual desktop instances or errors associated with the execution of virtual instances on the data center computer(s) by storing on storage servers independent from the data center computers. Additionally, the service provider network 105 can also facilitate client interaction with multiple virtual instances by maintaining the information in the desktop stores. In some embodiments, as described in further detail below, if one virtual desktop instance fails, a new instance may be launched, and attached to the same desktop store as previously attached to the virtual desktop instance that failed.

Logically, the desktop stores may be distributed across multiple servers, they may be replicated for performance purposes on servers in different network areas, or they may be replicated across multiple servers with independent failure profiles for backup or fault performance purposes. That is to say, the servers may be attached to different power sources or cooling systems, the servers may be located in different rooms of a datacenter or in different datacenters, and/or the servers may be attached to different routers or network switches. Illustratively, in some embodiments, a desktop store may be on one storage server, and changes made to the desktop store may be replicated to another desktop store on a different storage server. This replication creates a backup copy of the user's data. If the desktop store fails or the virtual desktop instance loses its connection to the desktop store, the PES 102 switches the connection of the virtual desktop instance from the desktop store to the back-up desktop store.

The PES platform 102 further includes a central storage device such as a PES repository 140 for storing data stored by the various desktop stores and backup stores on storage servers 107. The data center computers 110 and the storage servers 107 may further include additional software or hardware components that facilitate communications including, but not limited to, load balancing or load sharing software/hardware components for selecting instances of a virtual machine supporting a requested application and/or providing information to a DNS name server to facilitate request routing.

The service provider computer network 105 may also include a user profile store 108. The user profile store 108 may be used to store, for example, various programs a user is given access to while using a virtual desktop instance. The user profiles stored may also indicate a maximum time or cost associated with the remote computing sessions of different users. The PES platform 102 may take user profiles into consideration when placing and configuring virtual desktop instances. The PES platform 102 may also include, or be connected to, a virtual desktop image store 109. The virtual desktop image store 109 may include template images of operating systems without customizations applied per user profiles.

In an illustrative embodiment, data center computers 110 and storage servers 107 are considered to be logically grouped, regardless of whether the components, or portions of the components, are physically separate. For example, a service provider computer network 105 may maintain separate locations for providing the instances and the storage components. Additionally, although the data center computers 110 are illustrated in FIG. 1 as logically associated with a PES platform 102, the data center computers will be geographically distributed in a manner to best serve various demographics of its users. Additionally, one skilled in the relevant art will appreciate that the service provider computer network 105 can be associated with various additional computing resources, such additional computing devices for administration of content and resources, and the like.

With reference now to FIGS. 2-7, the interaction between various components of the networked computing environment 100 of FIG. 1 will be illustrated. Specifically, FIGS. 2-7 illustrate the interaction between various components of the networked computing environment 100 for the execution of virtual desktop instances by the service provider network 105 and the remote access to the virtual desktop instances from the client computing device 106. For purposes of the examples, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
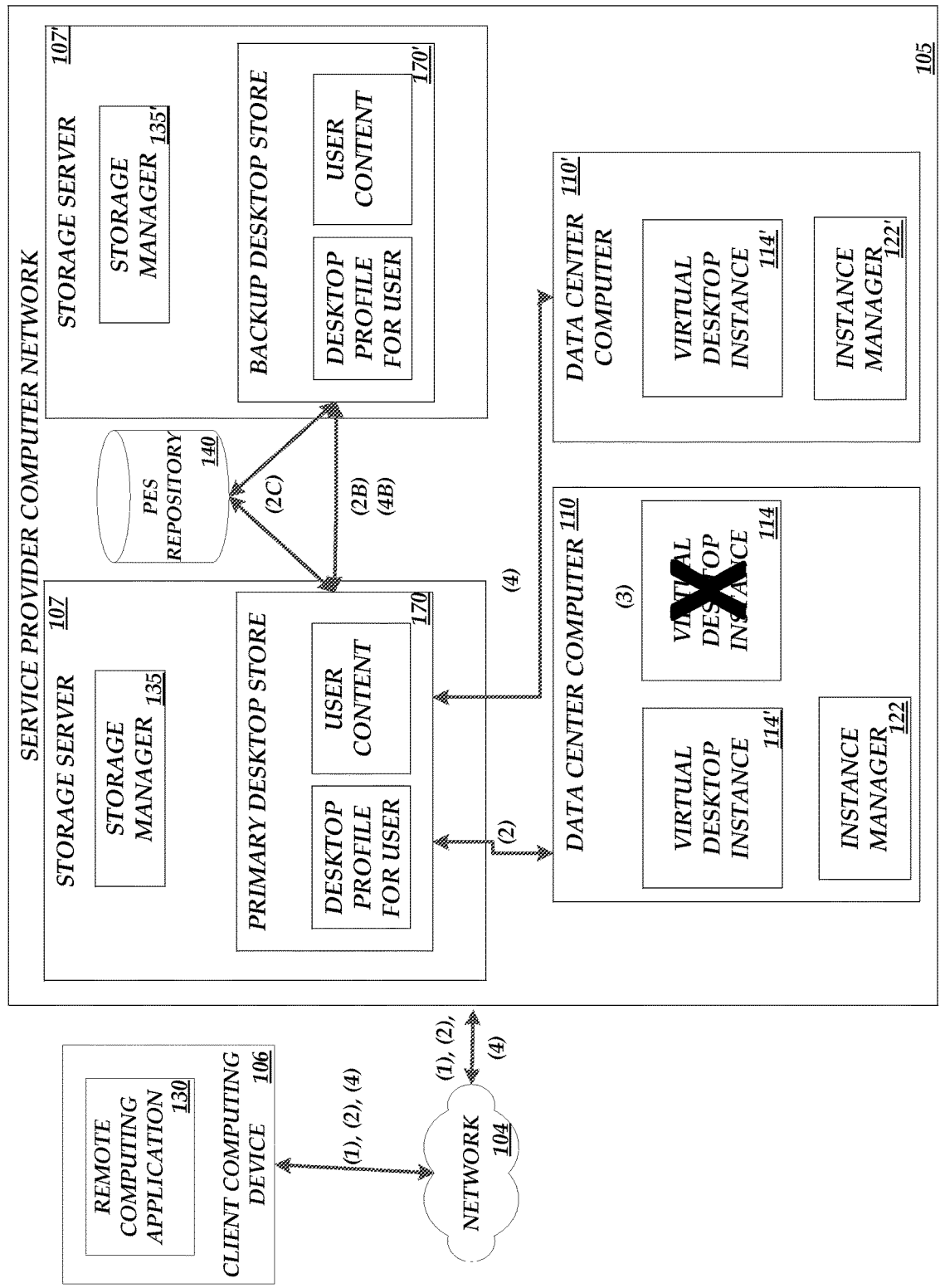
FIG. 2 is a block diagram of the networked computing environment of FIG. 1 illustrating the management of a virtual desktop instance after an event and the persistent storage of user data between virtual desktop instances.

With reference to FIG. 2, a virtual desktop instance 114 can be executed on any one of the data center computers 110 connected to the PES platform 102. If an event occurs in association with the execution of the virtual instance 114 on the data center computer 110, the execution can be transferred to another virtual desktop instance 114'. The other instance 114' may be executed on the same 110 or on a different data center computer 110'. In either case, the transfer occurs with minimal delay and disruption to the user experience on the client computing device 106 due to the use of the desktop store 170. As will be described below, the user's data remains available by continued association with the desktop store 170 across the transfer of execution of the virtual desktop instances 114 to 114'.

Illustratively, prior to the instantiation of a virtual desktop instance and establishment of a remote computing session, each instance manager 122 monitors the overall state and health of the respective virtual desktop instance. Such state and health information is sent from the instance managers 122 of the data center computers 110 to a data center management component 101 of the service provider. In addition, during the remote computing sessions, the instance managers 122 monitor the health and state of the network connection between the instances 114 and the client computing device 106. The instance managers 122 may also monitor the health and state of the connected client computing device 106 through an agent installed on the client computing device 106, for example. All of the monitored health and state information is sent to the data center management component 101. The information collected from the instance managers 122 and sent to the data center management component 101 is also referred to as state information herein. The state information collected from the various components is used to achieve the desired availability and reliability of services from the service provider computer network. If state information collected indicates a failure of one or more of the components, the failure can be addressed by transferring execution of the instances or accessing additional data storage locations.

As illustrated in FIG. 2, step (1), a request for a new remote computing session may be initialized when a client computing device 106 loads the remote computing application 130 in response to an event or user request. In some embodiments, the remote computing application 130 may prompt the user to enter a user name and password. In one embodiment, loading the remote computing application 130 may include copying executable code from a storage component into device memory. Subsequent to loading of the remote computing application 130, the client computing device 106 may request a new remote session, and transmit a request to the PES platform 102 of the service provider computer network 105. In one embodiment, a remote computing session may be started by a user in order to remotely access the user's desktop. In another embodiment, from the perspective of the client computing device 106, starting a remote session to handle execution of an application process may appear just as though the application process was being instantiated and executed on the local device.

Subsequent to the receipt of the request, at step (2), the PES platform 102 selects a user profile for the user that submitted the request using information such as an user account identifier. The user profile may be stored on the user profile store 108 (refer to FIG. 1). In an example embodiment, the user profile may include or be associated with information that indicates a virtual desktop instance template, or image, from which to create a virtual desktop instance for the user. For example, the virtual desktop instance template or image could specify an operating system to launch or a set of applications. The user profile could also include or be associated with information that indicates the number of processing units, memory, storage, bandwidth, etc. to give to the virtual desktop instance for the user. This information could be expressed as key-value pairs or abstracted to different types of virtual desktop instances (e.g., small instance, medium instance, or large instance). Thus, the user profile could indicate that the virtual desktop instance type is equal to "large," where large has a fixed amount of resources associated therewith.

A remote session may then be started to correspond to one or more application processes as identified by the client computing device 106. Illustratively, starting a new remote session may include booting a virtual desktop instance from an image within a virtual machine or a data center computer that is associated with allocated device memory, storage or cache space, processor time, network bandwidth, or other computational or network resources. The image may be accessed from a virtual desktop image repository, such as for example the virtual desktop image store 109 (illustrated in FIG. 1).

After the PES platform 102 retrieves the user profile from the user profile store 108 (illustrated in FIG. 1), the PES platform 102 determines a data center computer 110 that will execute the virtual desktop instance. For example, the PES platform 102 can obtain a list of data center computers 110 that are available to host a virtual desktop instance and apply filtering criteria to the list to obtain a subset of data center computers 110 from one or more computers that can accommodate the hosting requirements of the virtual desktop instance. Then, the PES platform 102 can select one of the data center computers 110 at random or by using any other selection process (e.g., round-robin, etc.). In a specific example, the PES platform 102 can obtain a list and filter out data center computers 110 that cannot provide the necessary resources (e.g., memory, storage, processing power, etc.). The PES platform may also filter out data center computers 110 that are already hosting N other virtual desktop instances 114 associated with a customer account associated with the user account (where N is an arbitrary number equal to or greater than 1 that can be set by an administrator or by the PES platform 102). The PES platform may also filter out data center computers 100 that have high latency to the client computing device 106, etc.

After an image from the virtual desktop image store 109 is used to create a virtual desktop instance 114, the PES platform 102 can also identify a desktop store, such as primary desktop store 170, to attach to the virtual desktop instance 114. For example, the PES platform 102 can select a data center computer 110 on which the virtual desktop instance 114 is to be executed and send the computer 110 a request to launch a virtual desktop instance 114 based on information in the user profile and send it a virtual desktop identifier. Illustratively, the association of the virtual desktop instance with the desktop store can be accomplished through the utilization of an Application Protocol Interface ("API"). For example, the instance manager 122 can utilize an API, such as an attach request, that can be transmitted to the storage service platform 103. The storage service platform 103 can verify that the virtual desktop instance 114 has the correct virtual desktop identifier and cause the user's desktop store 170 to be attached to the virtual desktop instance 114.

Network address information associated with the data center computer 110 can be sent to the client computing device 106. Once the client computing device 106 receives the IP address, a remote computing session may be started. Once the virtual desktop instance is configured, the PES platform 102 communicates with the client computing device 106, and sends a publicly accessible IP address associated with the virtual desktop instance. Once the client computing device 106 receives the IP address, it makes a connection request to the IP address. The user may then be authenticated, and then, if authenticated, the operating system on the instance loads the profile associated with the user. The profile is then used in order to allow the user interface, or the desktop of the virtual desktop instance, to look and feel the way the user prefers. For example, the configuration of the instance may include configuring the registry, changing the fonts, setting the desktop picture, organizing the favorites and links on the desktop, putting icons for the appropriate documents on the desktop, and the like.

In some embodiments, upon receipt of the client computing device request, the data center management component 101 may also select processing and network resources, and provision software on another instance, such as instance 116, in addition to instance 114. An additional instance may be provisioned for one or more users associated with a client computing device 106, for one or more instances connected to a client computing device, or for a combination of these.

Then, the instance manager 122 continues to monitor the state and health of the instance 114. An agent running within the virtual desktop instance 114 may also monitor and coordinate the receipt and storage of data created by the interaction of the user on the client computing device 106 with the virtual desktop instance executed at the PES platform 102. The data may include information such as which files the user has opened, details about the user profile, and any data files created while interacting with the instance executed on the PES platform 105. The data may also include details concerning the user's graphical user interface. For example, the data may include the various windows that the user has open on the client computing device 106, the absolute and relative position of the respective windows, the emphasis of any components in the windows, and the like. The instance manager 122 may send the state information to the data center management component 101 and it may also write changes to the desktop profile and user content to the primary desktop store 170.

With continued reference to FIG. 2, in some embodiments, in order to protect against failures of the primary desktop store, at step (2B), the data stored on the primary desktop store may be replicated onto a backup desktop store 170'. The backup desktop store 170' is associated with the same user of the instance 114 as the primary desktop store 170. Any changes made to the data are stored at the primary desktop store 170, and replicated to the backup desktop store 170'. The replication may be performed on a periodic basis, on an event-based basis, where data is only replicated when new data is created, or a combination of the two.

In some embodiments, at step (2C), the saved data may also be stored at the PES repository 140. The storage to the PES repository 140 may be performed on a periodic basis, on an event-based basis, or a combination of the two. In some embodiments, the data may be purged from the desktop stores 170, 170' on a periodic basis after storing on the PES repository 140. The period may be determined by an administrator of an entity associated with the users of the client computing devices 106.

Subsequently, at step (3), there may be an event associated with the virtual desktop instance 114. The event may include, for example, a failure of the virtual desktop instance. The virtual desktop instance failure may be due to a power outage, a network disconnection, a software or hardware failure on the data center computer, increased latency on the virtual desktop instance, a significant impairment of the virtual desktop instance, or any other failure of the instance. In case of such a failure, the state information sent from the instance manager 122 will indicate the failure to the data center management component 101. Alternatively, the primary desktop store 170 will detect an absence of changes to user information and indicate such absence to the data center management component 101.

Once the data center management component 101 detects an event associated with the instance 114, another virtual desktop instance is instantiated at step (4), such as for example virtual desktop instance 114'. The other virtual desktop instance 114' may be executed on the same data center computer 110, or on a different computer 110'. The other virtual desktop instance 114' may have been pre-configured, or the configuration may be started after the failure is detected on the virtual desktop instance 114. Once the data center management component 101 identifies the data center computer or the virtual desktop instance appropriate for execution, it sends the new public IP address to the client computing device 106 to re-connect to the new virtual desktop instance via a new remote computing session.

The user experience on the client computing device 106 appears almost seamless as the look and feel of the previous desktop is maintained across the old and new virtual desktop instance. The data previously sent to the PES platform 102 is made available to the new virtual desktop instance by a connection to the same primary desktop store 170. In addition, since the agent running within the virtual machine instance 114 collected information regarding the applications previously opened by the user, the same applications are opened on the new virtual desktop instance. Since the data saved included details about the user's graphical user interface, the user's perspective of the application process on the client computing device remains substantially uniform across the different instance executions. Thus, the new virtual desktop instance preserves the application process running on the client computing device 106, and the data previously sent to the PES platform 102 is restored to the new instance. The client computing device 106 retains the same user experience because the user data is synchronized between the different instances during the failure and re-establishment of the remote computing session.

In some embodiments, the user may be prompted to re-enter the user name and password for executing the remote computing application 130. In other embodiments, the user name and password may be stored in the data through a mechanism such as cookies, or electronic certificates, and the like, and the user name and password may be automatically loaded when the remote computing session is re-established.

As described above, the transfer of the remote computing session from one instance to another is done with minimal delay and disruption to the user experience on the client computing device 106. The delay and disruption is minimized by providing persistent storage of the data received from the client computing device 106.

In some embodiments, the virtual machine instance 114 may not fail, but instead, the primary desktop store 170 may fail. If the storage manager 135 detects such a failure of the primary desktop store 170, the connection between the virtual desktop instance 114 and the primary desktop store 170 is detached, and a connection is established between the virtual desktop instance 114 and the backup desktop store 170', as illustrated in step (4B).

In some embodiments, the data collected at the data center management component 101 may be used to determine a state of the client computing device 106 to restore when re-establishing the remote computing session between the virtual desktop instance 114 and the client computing device 106. For example, the data collected may be used to determine a problematic state at the client computing device 106, and such a state may be determined to not be restored. The problematic state may be determined based on the severity and the frequency of problems encountered when connected to the client computing device 106.

Figure 3:
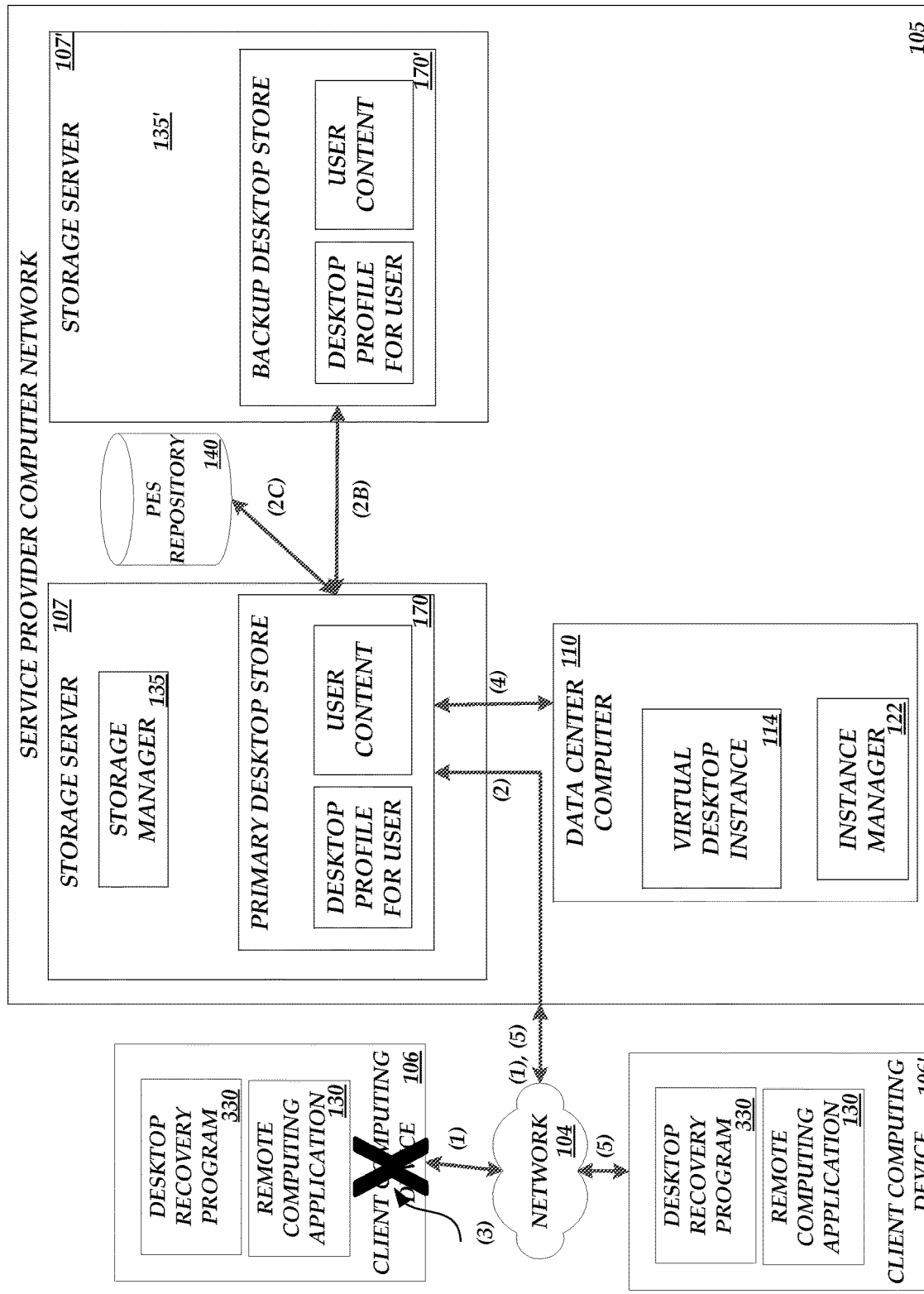
FIG. 3 is a block diagram of the networked computing environment of FIG. 1 illustrating the use a remote computing session between a service provider computer network and a client computing device for recovering from an event associated with the client computing device.

With reference to FIG. 3, the networked computing environment 100 can also be used to start a remote computing session between the PES platform 102 and a client computing device after an event associated with that or a different device used by a same user. Illustratively, a remote computing session can provide a copy of the hard drive of a client computing device 106 initially connected to the PES platform 102 to that same device 106 after recovery, or to a different device 106' used by the same user.

In some embodiments, it is possible for the client computing device 106 to be executing an operating system and applications locally, without remote execution of a virtual desktop instance 114 on the PES platform. The PES platform 102 may be used to replicate the hard drive of the client computing device 106 computing environment on one or more of the storage servers 107, and to then make the copy of the hard drive available to the user on the client computing device 106 or on another client computing device 106' as a virtual desktop instance 114. In some embodiments, the PES platform 102 may be used to replicate the user content and desktop profile to a desktop store 170 on one or more of the storage servers 107 or to the PES repository 140, and to then attach that desktop store 170 to a virtual desktop instance 114 that is made available to the user of the client computing device 106 or 106'.

Users may sign up for a service from the service provider computer network 105, such as, for example, a desktop recovery service. Users subscribed to the service may be provided with a computer program to download on their client computing device, such as for example a desktop recovery program 330. The desktop recovery program 330 may then be run on the client computing device 106, and, as indicated by step (1), a session may be started between the client computing device 106 and the PES platform 102. After the session is established, the PES platform 102 may associate one or more of the desktop stores 170 with the user, as described above in connection with FIG. 1.

With continued reference to FIG. 3, after the desktop store 170 is associated with the user session, the PES platform 102 may, at step (2), initiate a replication of the hard drive image of the client computing device 106 or the desktop profile for the user and user content, such as files stored in various folders. The replication of the hard drive image or the desktop profile for the user and user content may include a copying of portions of the disk of the client computing device 106 to the PES repository 140 or the desktop store 170. In the instance where the entire image is replicated, the copying may require some time, depending on the bandwidth of the network connection between the client computing device 106 and the PES platform 102. In some embodiments, at step (2B), the hard drive image may also be replicated to a backup desktop store 170'. In addition, in some embodiments, at step (2C), the image may also be periodically stored on the PES repository 140.

Subsequently, any changes made to the hard drive image, or to portions of the user content and desktop profile by the user's interaction with the client computing device 106 are replicated by the PES platform 102 by saving onto the desktop store 170 via a remote computing session. The replication of the changes may be scheduled based on the network connection bandwidth. For example, if the network connection bandwidth is high, replication may occur each time the client computing device's file system flushes its buffers to the disk. In contrast, if the network connection bandwidth is low, the replication may be scheduled to be performed periodically, such as for example, once per day, once per week, or any other suitable time, or based on a condition such as for example, when the network connection bandwidth is above a given threshold.

If there is a failure of the client computing device 106, as indicated by step (3), a copy of the hard drive or the user content and desktop profile associated with the user of the client computing device 106 is available at the PES platform 102. The failure may include one or more of a power outage, a network disconnection, a software or a hardware failure, or any other failure. The PES platform 102 may use the copy of the hard drive image to configure a virtual instance 114 on one or more of the data center computers 110, or it may attach the desktop store 170 where the user content and desktop profile associated with the user are saved to a virtual desktop instance 114, as indicated by step (4).

Consequently, when a new client computing device 106' is used, or the client computing device 106 recovers from the failure, the desktop recovery program 330 and the remote computing application 130 are loaded on the device 106 or 106'. Then the remote computing application 130 may prompt the user to enter a user name and password. Subsequent to loading of the remote computing application 130, a request for a new remote computing session is transmitted to the PES platform 102 of the service provider computer network 105 at step (5).

Subsequent to the receipt of the request, the PES platform 102 selects a user profile using information such as a user account identifier included with the request. The user profile may be stored on the user profile store 108. In an example embodiment, the user profile may include or be associated with information that indicates an instance template from which to create an instance for the user. For example, in the case where the hard drive copy was created, the instance template could specify the hard drive image previously saved for the user to use as the instance template. A remote computing session may then be started to boot a virtual desktop instance from the copy of the user's hard drive image previously saved on one of the desktop stores 170 on one of the data center computers 110. In the case where the user content and desktop profile were saved, a desktop store 170 including the user content and desktop profile may be attached to a virtual desktop instance 114 to be accessed by the user.

Figure 4:
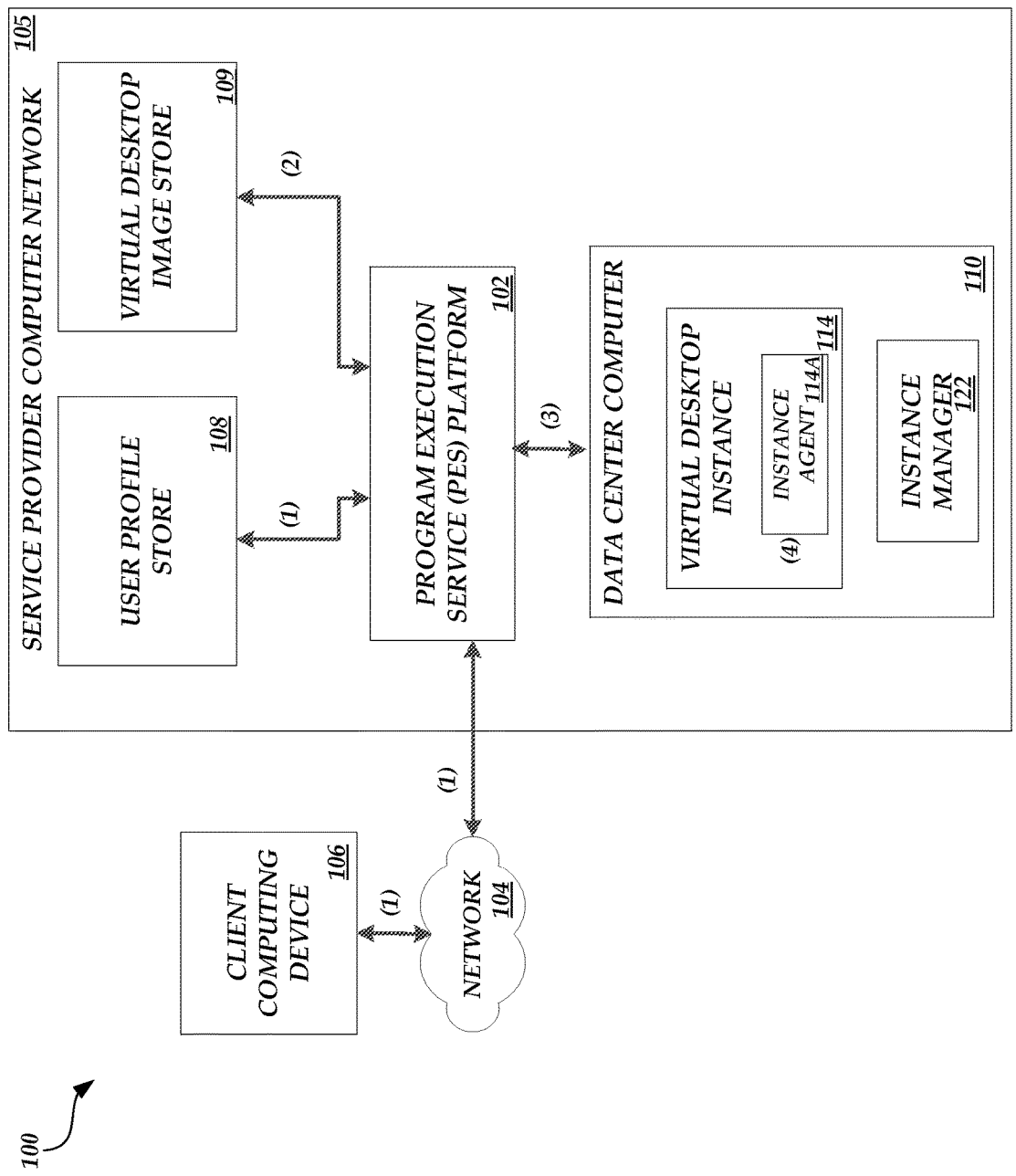
FIG. 4 is a block diagram of the networked computing environment of FIG. 1 illustrating the service provider computer network accommodating a variety of virtual desktop instance requirements according to different user profiles.

With reference to FIG. 4, a block diagram of the networked computing environment of FIG. 1 illustrating the configuration of the PES platform 102 for accommodating different user requirements is disclosed. As described above, a new remote computing session may be initiated when a client computing device 106 loads the remote computing application 130 in response to an event or user request. Subsequent to loading of the remote computing application 130, the client computing device 106 may request a new remote session.

Subsequent to the receipt of the request, the PES platform 102 configures a data center computer 110 and an instance 114 to service the requested new remote session. The data center computer and the instance may be configured based on one or more application processes identified by the request and various memory or processing requirements associated with such application processes as stored in the user profile store 108.

For example, users of client computing devices 106 associated with an entity may have restrictions associated with them. The restrictions may be set by an administrator. The restrictions may include, for example, applications each user can have access to, and memory and processing limits associated with the different virtual desktop instances accessed by the users. For example, an administrator may set a default instance size for individual users. The default instance size may be stored in the user profile store 108 associated with the individual users, according to a user identifier, for example. The user profile store 108 may also include a variable for varying the instance size, depending on applications executed by the instance.

In one embodiment, a user may be restricted to execute applications with low processing requirements, such as electronic mail or web browsers only. Such a user may be provided access to a virtual desktop instance that is allocated a low amount of resources to support such applications. In contrast, the user may be authorized to execute applications with higher processing requirements, such as professional drafting or photo editing applications. This type of user may be given access to a virtual desktop instance that is allocated a large number of resources, sufficient to enable the user to run the applications. The applications authorized for different users may be saved in the user profiles for the user account. Alternatively, the different types of applications may be requested by the user while using the virtual desktop instance.

Illustratively, the processing requirements associated with a user or a client computing device may be determined based on a variety of scenarios. The determination may be based on a user request at launching of the remote computing application 130. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on pre-selected options for certain users as determined by administrators of entities associated with the users. For example, the pre-selected options may be presented to the user as a list of different packages of applications to which the user may wish to have access. In some cases, the determination may be made on historical usage data of a user, which the PES platform 102 may determine once the request is received from the user. In other cases, the determination of the processing requirements may be based on ongoing monitoring of use of processes by the user once the remote computing session is initiated. In such cases, the selection of the adequate instance may be dynamically changed after the session is established, and the dynamic change over to a new instance may be performed as described with respect to FIG. 1 above.

Referring again to FIG. 4, once the request is received from the user at step (1), and the user profile store 108 is accessed to determine the user requirements, then, at step (2), a virtual desktop image is retrieved from the virtual desktop image store 109 and configured according to the user requirements. Then the customized virtual desktop image is used to configure an instance 114. After the instance 114 is configured, at step (3), the PES platform determines a data center computer 110 on which to launch the instance. For example, the PES platform 102 can obtain a list and filter out data center computers 110 that cannot provide the necessary resources (e.g., memory, storage, processing power, etc.). Once the data center computer 110 is selected, the network information associated with the data center computer 110 can then be sent to the client computing device 106. Once the client computing device 106 receives the network information, a remote computing session may be started. Once the virtual desktop instance is configured, the PES platform 102 communicates with the client computing device 106, and sends a publicly accessible IP address associated with the virtual desktop instance. Once the client computing device 106 receives the IP address, it makes a connection request to the IP address. The user may then be authenticated, and then, if authenticated, the user is provided with an image of the virtual desktop as configured above.

In some embodiments, an instance agent 114A can monitor, at step (4), the amount of CPU and memory that the instance 114 is using and can also ask for more resources from the PES platform 102 if they are needed. In some embodiments, each application can be tagged with information indicating how many resources are needed. When the instance agent 114A detects a launch of a program, the agent can be configured to look up requirements in a table or signal to the PES platform 102 that the application launched, so that the PES platform 102 can send a signal to the agent 114A indicating the resources need to be allocated to the instance 114.

The determination of the optimal instance for a user may help implement usage-based billing of the users. Instances allocated with a large number of resources may be restricted. For example, such instances may only be provided to certain authorized users, or may only be provided to certain users for limited periods of time. The usage-based billing of the different instances may include a base price component for the use of the service provider resources, and a variable price component based on the allocated resources and the total time used with different the different resources. A user's use and request of resources may also be used for user management by an administrator of an account associated with the user. For example, a notification may be sent to the administrator when the user requests a level of resources exceeding a given threshold.

The determination of the resources to allocate to instances may also be based on the cost associated with the use of the resources. For example, a given instance configured with a given level of resources may be limited to be used up to a threshold amount of cost of use of those resources. In another example, the instance may be used with a threshold amount of allocated resources. Alternatively, a user's access to an instance may be downgraded to an instance with lower resources after a threshold amount of time monitored to be idle or indicating low resource utilization during a given session.

An administrator may provide different rules for authorizing users' access to resources on the virtual desktop instances. For example, the rules may define different types of users and the types of users may be stored in a set of rules provided to the program execution service (PES) platform by the entity. The rules may be associated with the different users' login information, such as a user account identifier, and stored in user profile stores 108. When the user launches the remote computing application 130 on the entity's client computing device 106, the PES platform 102 may determine, based on the login information received, the appropriate instance according to the specifications included in the user profile associated with the user account identifier.

For purposes of an illustrative example, assume a contractor hired by the entity may be authorized to use a determined application process for a determined amount of time on the client computing device 106. Therefore, the entity assigns the desired requirements to the contractor's user identity, as communicated to the PES platform 102. Then, when the contractor launches the remote computing application 130, the login indicates the contractor's user identifier. Thereafter, the service provider determines the instances and data center computers to configure to be associated with the client computing device 106 for that and any subsequent remote computing session. The data center management component 101 of the service provider monitors the contractor's use of the determined processes, processing levels and times of use, and limits the use as per the predefined conditions of the entity administrator. The contractor need not install any software applications on the client computing device 106, and the entity need not monitor use of any applications by the contractor. The PES platform 102 accommodates both parties' needs centrally.

The configuration of the applications and the processing requirements of the applications based on predetermined user types may be used for billing the entity. The usage-based billing of the different instances may include a base price component for the use of the service provider resources, and a variable price component based on the processing requirements, and the total time used with the different processing requirements. Alternatively, the entity may obtain licenses to a variety of application processes from the PES platform 102, and the licenses may be used by a variety of users authorized by the entity, when the entity makes available a client computing device 106, and the user name is associated with the appropriate permissions for the various application processes needed for the respective user.

The configuration of the service provider instances may also be used to provide pre-selected combinations of application processes on the different instances, based on historical requests or provisions of the instances during remote computing sessions. The combinations of application processes and processing requirements may be configured to different types of users, for example. The types of users may be for example, simple email readers and web browsers, or may be professional drafters or photo editors. In some embodiments, the configuration of the instances may also be based on storage requirements associated with the application processes instead of, or in addition to, the processing requirements.

Figure 5:
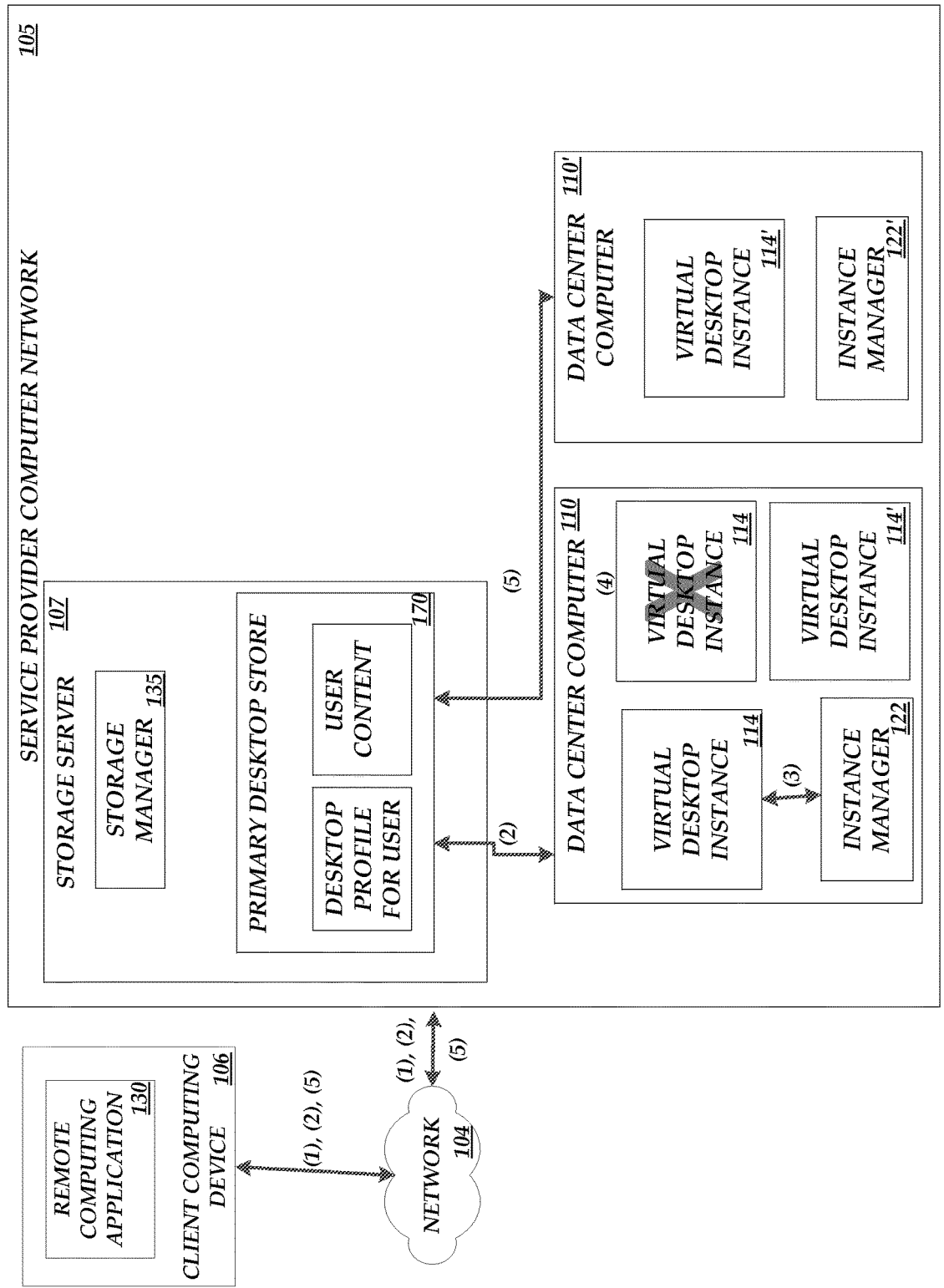
FIG. 5 is a block diagram of the networked computing environment of FIG. 1 illustrating the service provider computer network accommodating a change in the virtual desktop instance requirements.

With reference to FIG. 5 a block diagram of the networked computing environment of FIG. 1 illustrating the adjustment of the remote computing session based on the resource requirements for the instance is disclosed. As illustrated in FIG. 5, the service provider computer network 105 may adjust the resources allocated to an instance, or may provide a new instance on the same or a different data center computer if the resource requirements associated with the initial instance are changed. As described above, a new remote computing session may be started when a client computing device 106 loads the remote computing application 130 in response to an event or user request. Subsequent to loading of the remote computing application 130, the client computing device 106 may request a new remote session at step (1). After receipt of the request, at step (2), the PES platform 102 selects a data center computer 110 to service the requested new remote session, and the appropriate instance to launch, based on the user profile store on user profile store 108. After establishing the session, the instance may be dynamically adjusted based on monitoring the use of the instance by the user of the client computing device 106 by the instance manager 122 at step (3).

For example, while the user of the client computing device 106 interacts with the virtual desktop instance, the user may access applications requiring only low processing power, and low memory requirements. However, after some time, the user may request access to one or more applications requiring more processing power and more memory. In some embodiments, the request for the different requirement may be initiated by the user's selection of an icon for an application on the desktop interface. In some embodiments, the request may be initiated by the user's selection of an option from a list of options in a control panel. For example, the list of options may include a sliding scale of different amounts of processing power and memory. In either case, the instance manager 122 determines the need for a different configuration of the instance 114 at step (4).

The PES platform 102 may dynamically adjust the amount of resource allocated to the virtual desktop instance to accommodate more processing power and memory. In some embodiments, at step (5), the adjustment may require re-launching instance on the same or a different data center computer. The re-launching of a virtual desktop instance may include terminating the running instance, de-associating the desktop store from the instance, selecting a data center computer to launch the new instance, instantiating the new instance on the selected data center computer, and associating the desktop store to the new instance. Once the instance is instantiated, the user may be provided access to it by a login prompt.

In other embodiments, the adjustment may include adding additional resources to the virtual desktop instance without termination of the instance. For example, the instance manager could add another processor or memory to the virtual machine executing the desktop instance, etc. In some embodiments, the processor may be added to the virtual desktop instance by hot-adding a CPU to the virtual desktop instance. The CPU may be hot-added by adding new hardware to the data center computer, logically performing hardware partitioning online, or virtually through a virtualization layer. The data center computer 110 need not be automatically started after the CPU is added, but may simply be reconfigured to recognize the new CPU as an available resource. In some embodiments, the memory may be added to the virtual desktop instance by hot-adding memory to the virtual desktop instance. Hot-adding memory to the data center computer 110 may be implemented by ensuring that a mechanism for adding physical memory to the operating system instance is supported without requiring any operating system downtime or any system power operation.

Figure 6:
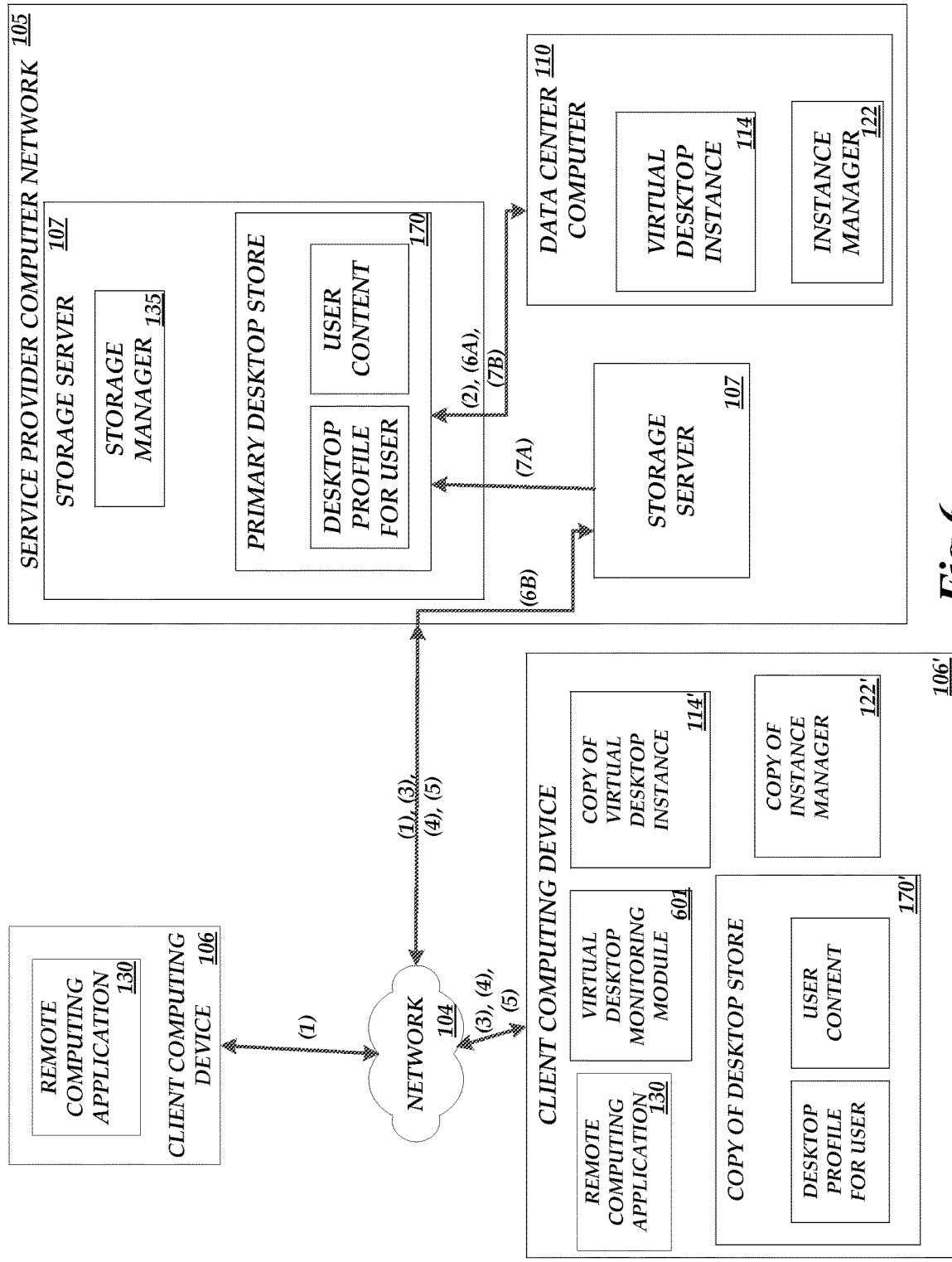
FIG. 6 is a block diagram illustrative of the networked computing environment of FIG. 1, including the client computing device and the service provider computer network when operation is transitioned from a remote to a local networked environment.

FIG. 6 is a block diagram illustrative of the computing environment of FIG. 1 when operation of the virtual desktop instance is transitioned from a remote to a locally networked environment. In some embodiments, a remote computing session established between the PES platform 102 and the client computing device 106 may be lost due to a network disconnection or failure. For example, a user of the client computing device 106 may travel to an area not serviced by the network 104. In order to accommodate for such disconnections, the remote computing session between the PES platform 102 and the client computing device may be used to transfer information from the data center computer to the client computing device 106 in order to equip the client computing device 106 with the necessary components for transitioning to a locally executed copy of the virtual instance previously executed on the PES platform.

For example, a client computing device 106 may be connected to a PES platform 102 via a network 104, and the device 106 may be disconnected from the network 104 prior to a user boarding an airplane. Prior to disconnecting from the network 104, optionally after prompting the user for approval, the client computing device 106 may be provided an image of the operating system, such as the image stored on the virtual desktop image store 109. Since the client computing device 106 may have a different configuration of processing power or memory than the data center computer 110, the image of the operating system adapted to the client computing device may have a corresponding power and memory configuration. The client computing device 106 may also be adapted with the latest saved version of the data with a copy of the desktop store. Finally, the client computing device 106 may also receive from the service provider computer network 105 a virtual desktop monitoring module 601 to launch an instance 114' based on the image of the operating system provided and to attach the instance 114' to the local copy of the desktop store 170'. Thereafter, when the client computing device 106 is disconnected from the network 104, the user may continue to use the device with the instance being executed locally on the client computing device 106. The client computing device 106 may then have the data and the adapted version of the instance executed while on the airplane.

In another embodiment, the client computing device 106 may be provisioned with a copy of the image of the operating system, the instance manager, and the virtual desktop monitoring module 601 without connecting with the PES platform 102. For example, the computing devices 106 of an entity may be configured with the appropriate image and module by the information technology (IT) department of the entity. Upon connection with the PES platform 102, and prior to disconnecting from it, optionally after being prompted for approval, the client computing device 106 may be provided with the latest saved version of the data with a copy of the desktop store. Then, the virtual desktop monitoring module 601 may launch an instance 114' based on the image of the operating system, and may attach the instance 114' to the local copy of the desktop store 170'. Thereafter, when the client computing device 106 is disconnected from the network 104, the user may continue to use the device with the instance being executed locally on the client computing device 106. The client computing device 106 may then have the data and the adapted version of the instance executed while on the airplane.

Then, when the user of the client computing device 106 returns to an area within the service provider's network (for example, gets off the airplane at its destination city), the PES platform 102 re-establishes the remote computing session with the client computing device 106, and all of the user's data is synchronized, and the user's disruption in the use of the application processes is thus minimized.

The steps involved in transitioning the operation of the virtual instance from the remote to the locally networked environment are shown in FIG. 6. At step (1), a remote session is started between the client computing device 106 and the PES platform 102. As described above, the user profile store is accessed, and the appropriate instance is configured for the user. Following the configuration of the instance, a data center computer 110 is selected to launch the virtual instance desktop, and the user is provided access to the virtual desktop instance 114 on the data center computer 110.

Then, at step (2), while the user is accessing the virtual desktop instance in the remote session, the user's changes to the desktop profile and to user content are stored at the desktop store 170. At step (3), in some embodiments, the client computing device 106 may indicate to the PES platform 102 that the network connection is expected to be lost. Upon such indication, or for synchronizing purposes, the PES platform 102 provides, at step (4), a copy 170' of the desktop store 170, a copy of the image of the operating system executed by the instance 114, and a copy 122' of the instance manager 122 to the client computing device 106, so that the instance 114' is executed locally on the client computing device 106 while there is network connection available with the PES platform 102. As described above, in some embodiments, the image of the operating system, the instance manager and the virtual monitoring module 601 may already be installed on the client computing device 106, and the PES platform would only provide a copy 170' of the desktop store 170.

Once the instance 114' is available on the client computing device 106, it is executed locally, and all changes made to the desktop profile of the user and the user content are stored on the local copy of the desktop store 170'. Then, when a network connection is re-established with the PES platform 102, at step (5), a remote computing session is requested from the remote computing application 130 of the client computing device 106. As in the above, at step (6A), the user's user profile is used to instantiate a virtual desktop instance 114 on a data center computer 110, and at step (6B), when the client computing device 106 is connected to the PES platform, the copy 170' of the desktop store is saved to a storage server 107. Then, at step (7A), the changes made to the copy 170' of the desktop store are synchronized to the primary desktop store 170 associated with the user, and at step (7B), further changes received from the user while interacting with the virtual instance 114 in the remote session are also saved to the primary desktop store 170.

Figure 7:
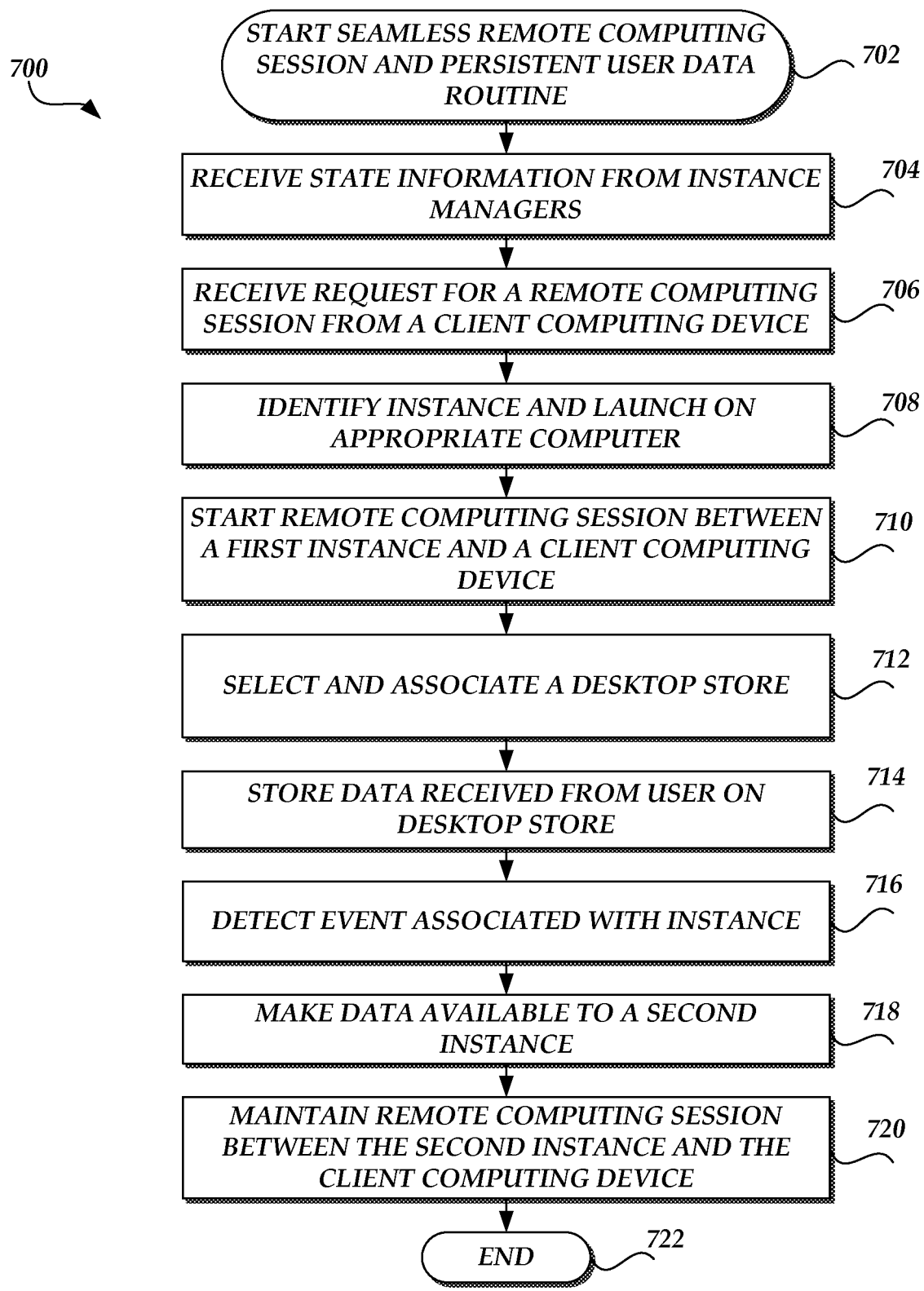
FIG. 7 is a flow diagram illustrative of a routine for the management of a virtual desktop instance after an event and the persistent storage of user data between virtual desktop instances.

FIG. 7 is a flow diagram illustrative of a routine 700 for the process of providing a seamless remote computing session and persisting the user data between the client computing device 106 and the PES platform 102 if an event occurs with the instance at the PES platform 102. The routine 700 begins at block 702. At block 704, the PES platform 102 receives state information from the various instances running on the data center computers in the system. The state information may be received from the instances periodically or when predetermined events occur at the instances. The period between receipts may be in the order of milliseconds, seconds, minutes or a different duration. The predetermined events may be related to the health of the instances, the health of network connectivity of the instances, and the like. The PES platform 102 continues to receive state information throughout the duration of the routine 700.

At block 706, the PES platform 102 receives a request for a new remote computing session from a client computing device. At block 708, the PES platform 102 selects an image and an amount of resources to allocate to an instance generated using the image. In various embodiments, the appropriate instance may be based on information included in the user profile store in association with the user of the client computing device from which the request is received. Once the instance is selected, an appropriate data center computer may be selected to host the instance, and at block 710, the PES platform 102 starts a remote computing session between the instance and the client computing device. At block 712, the PES platform attaches a specific data store to the instance, for that user.

While the remote computing session is established, the data created by the user's interaction with the virtual desktop instance at the PES platform 102 is then saved to the desktop store selected at block 714. In some embodiments, the PES platform 102 may additionally copy the data received onto a second desktop store. In some embodiments, the PES platform 102 may periodically transfer the data to a centralized PES repository in order to free up storage on the desktop store. Then, at block 716, the PES platform 102 detects a failure of the instance involved in the remote computing session. In one embodiment, the PES platform 102 may identify the failure based on state information received from the instance, or, alternatively, based on not receiving such state information from the instance.

Subsequent to detecting a failure at the instance at block 716, the PES platform, at block 718, the PES platform 102 causes the data to be made available to a second virtual desktop instance. The data may be made available to the second virtual desktop instance through synchronizing the data, or by removing the association between the desktop store and the initial instance, and associating the desktop store with a new instance. Once the data has been made available to the second virtual desktop instance, then the routine moves to block 720. In some embodiments the virtual desktop instances of the PES platform 102 may be pre-configured according to user profiles. In such embodiments, when a failure is detected at block 716, then the PES platform 102 identifies another instance that has been pre-configured with the required user profile. Alternatively, the instance may be configured after detection of the failure at block 716. Then, with the new instance identified, the required IP address information is communicated to the client computing device, and the remote computing session is re-established at block 720. The routine 700 ends at block 722.

Figure 8:
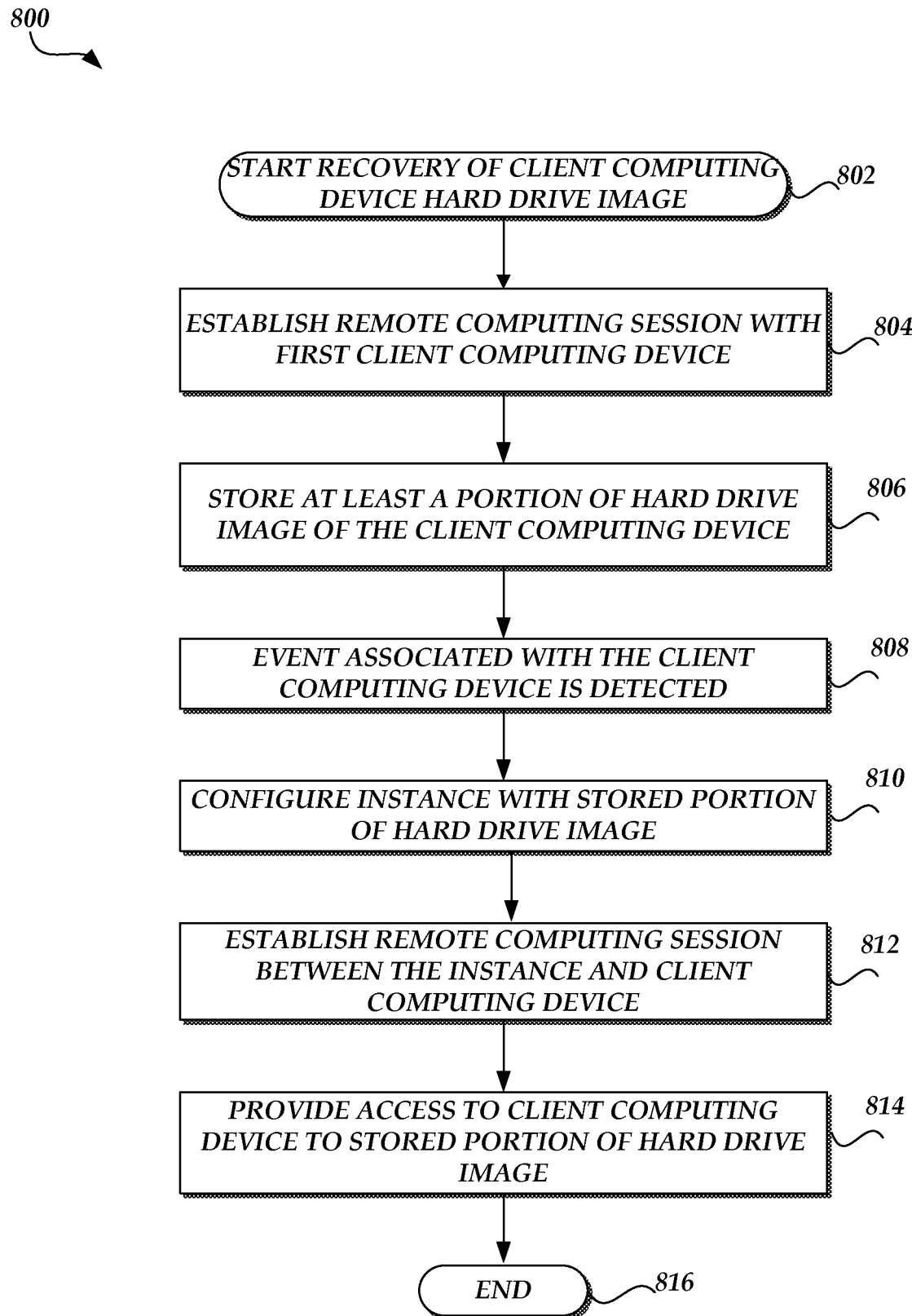
FIG. 8 is a flow diagram illustrative of a routine for the use of a remote computing session between the service provider computer network and a client computing device for recovering from an event associated with the client computing device.

FIG. 8 is a flow diagram illustrative of a routine for using a remote computing session between the service provider and a client computing device to recover an image of the hard drive after failure of a client computing device. At block 804, a remote computing session may be established between a client computing device and the PES platform for the purpose of providing a desktop recovery service. Once the session is established, the PES platform may, at block 806, store an image of the client computing device hard drive. In some embodiments, the client computing device may locally run, in addition to the remote computing application, an operating system and applications. In such embodiments, the client computing device has a local hard drive image, which includes all of the processing and configuration information associated with the operating system and the applications executed on it. In some embodiments, the remote computing session may be used to replicate the image of the client computing device's hard drive. The storing of the image may take a period of time dependent on the network connection bandwidth between the client computing device and the PES platform 102. The storing of the hard drive image may also include a replication of changes made to the hard drive by the user of the client computing device. The changes made may be replicated periodically, or depending on the availability of network bandwidth. Similarly, in some embodiments instead of storing an image of the client computing device's hard drive, the PES platform may store user content (e.g., folders and the files and other folders stored therein) and desktop profile settings for the user (e.g., the background image, the screen saver, the layout of folders and files on the desktop, etc.).

Then, at block 808, a failure of the client computing device may be detected. The failure of the client computing device may be due to a power outage, a network disconnection, software or hardware failures, or any other failure causing the remote session to be disconnected. The image of the hard drive and all changes to it are available at the PES platform.

Consequently, when the user of client computing device utilizes a new client computing device, or re-connects to the desktop recovery service using the same device, a request for a new remote session is sent to the PES platform 102. Upon receipt of the request, at block 810, the PES platform configures a virtual desktop instance with the image of the hard drive stored and associated with the user, according to a user identifier retrieved from the user profile store. Then, at block 812, and the PES platform 102 establishes the remote computing session with the user's computing device. Once the remote computing session is established, the PES platform 102 allows the user to access the instance based on the hard drive stored, or alternatively, provides the user with access to the user content and desktop profile saved for the user. The routine 800 ends at block 816.

Figure 9:
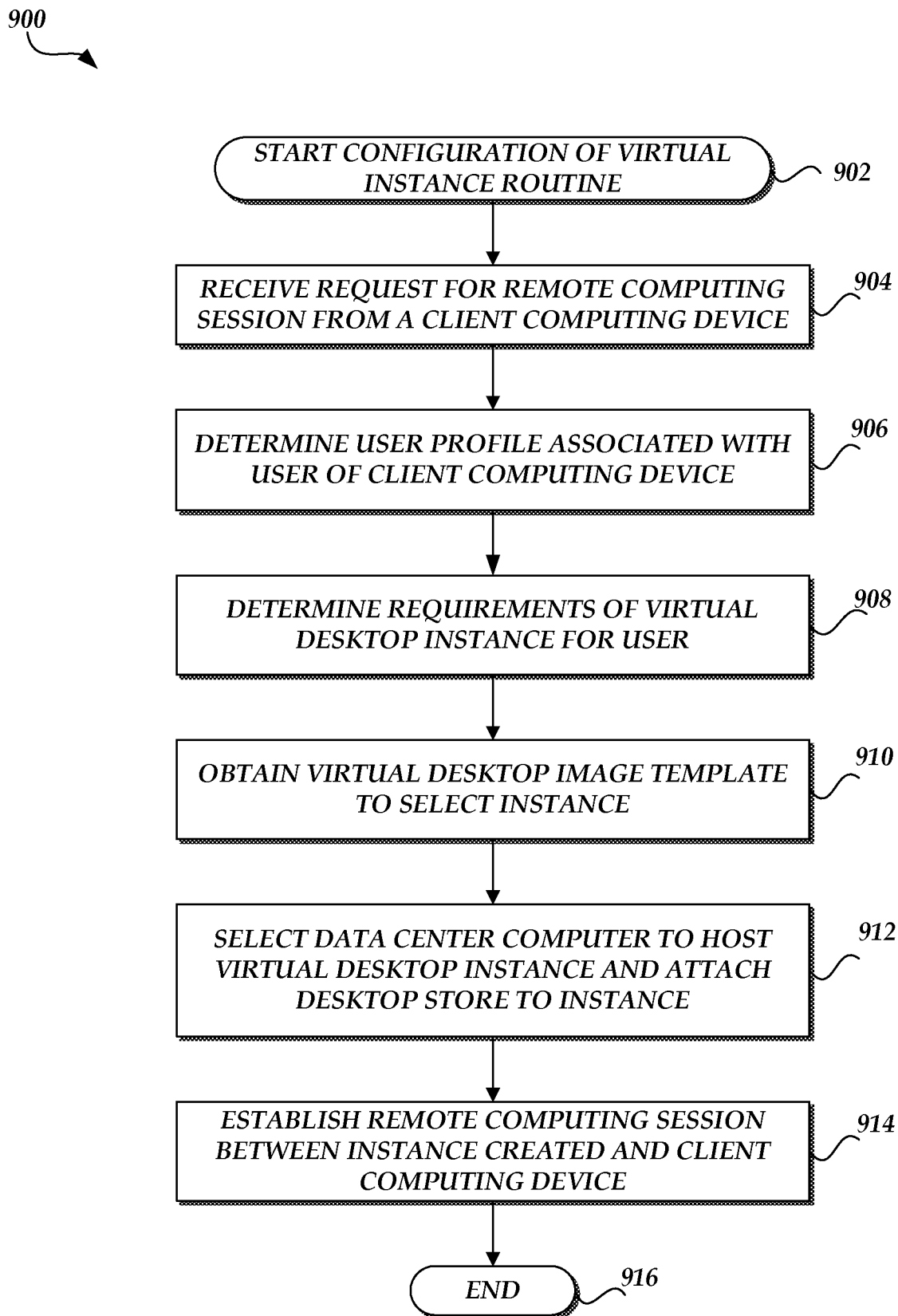
FIG. 9 is a flow diagram illustrative of a routine for the accommodation of a variety of virtual desktop instance requirements determined according to different user profiles.

FIG. 9 is a flow diagram illustrative of a routine for the configuration of a virtual desktop instance based on the process requirements associated with in the user of a remote computing session. As described above, a new remote computing session may be instantiated when a client computing device loads the remote computing application in response to an event or user request. Subsequent to loading of the remote computing application, the client computing device may request a new remote computing session.

The routine 900 starts at block 902. At block 904, a request for a remote computing session is received from a client computing device. At block 906, based on a user identifier determined from the user login included with the request, the PES platform 102 determines a user profile associated with the user, as stored on a user profile store. Then, at block 908, the processing requirements for an instance to be provided to the user are determined from the user profile. Then, at block 910, the PES platform 102 obtains a virtual desktop image template from a virtual image store. For example, the user profile may indicate that the user has been assigned a "premium" instance, which indicates that the user is to be allocated an instance with a large amount of resources (memory, CPU cores, network bandwidth, GPU code, etc.) and a premium set of applications. Turning to block 912, a data center computer system can be selected to host the virtual desktop instance and the instance template can be sent to the selected computer system. The instance manager on the computer system can launch a virtual desktop instance. The user profile may include restrictions for instance requirements as established by an entity's administrator. Next, at block 914, once the appropriate instance has been configured (e.g., by attaching a data store to it), the remote computing session is established between the instance and the client computing device. The routine 900 ends at block 916.

Figure 10:
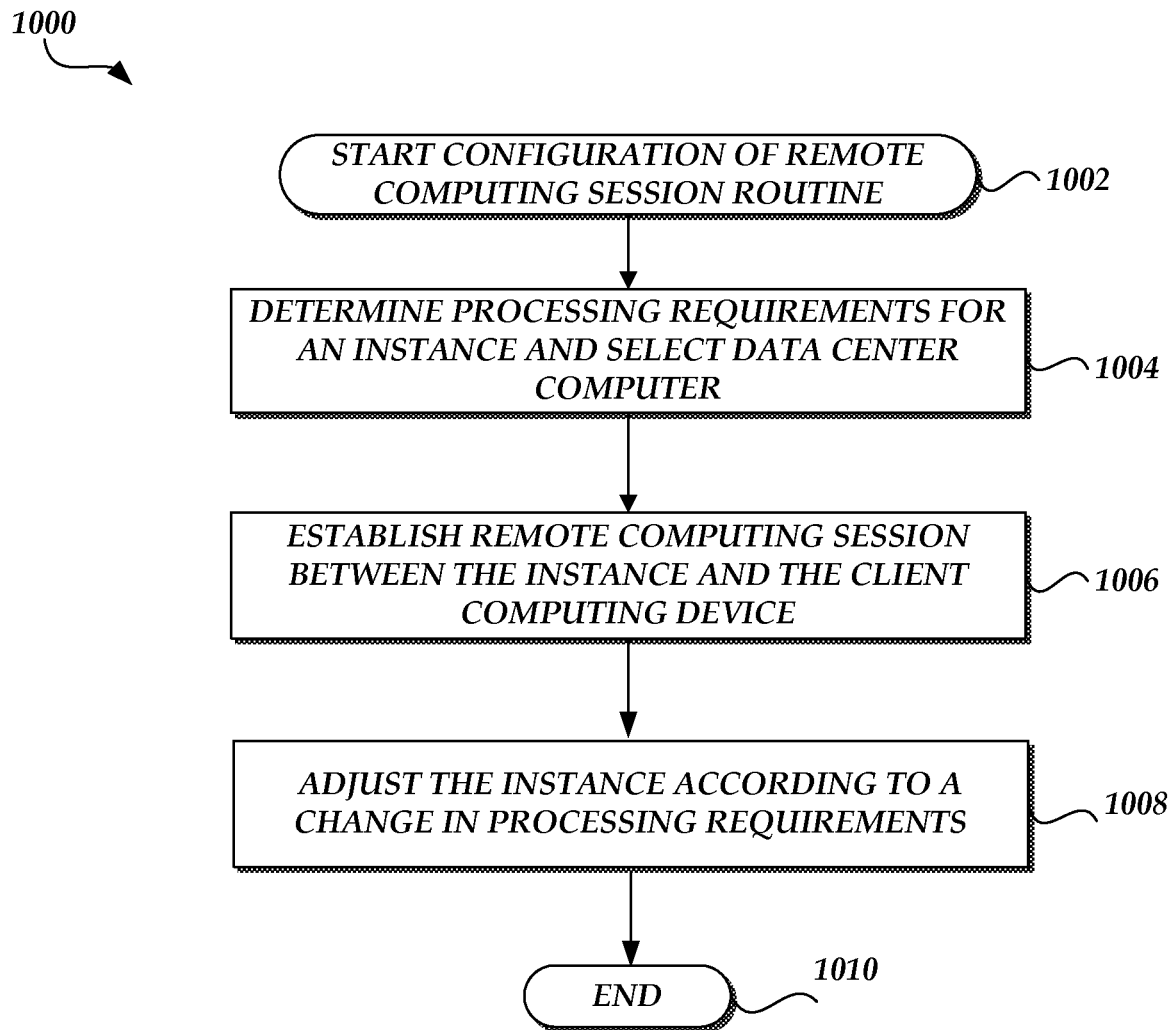
FIG. 10 is a flow diagram illustrative of a routine for the accommodation of a changes in virtual desktop instance requirements.

FIG. 10 is a flow diagram illustrative of a routine for the configuration of the remote computing session for accommodating changes in process requirements. As described above, a new remote computing session may be instantiated when a client computing device loads the remote computing application in response to an event or user request. Subsequent to loading of the remote computing application, the client computing device may request a new remote computing session. The routine 1000 starts at block 1002. At block 1004, upon receipt of the request from a client computing device, the PES platform 102 determines the processing requirements for the client computing device, based on the user profile of the user of the client computing device. The PES platform 102 selects a data center computer to service the requested new remote session.

For example, a user of a client computing device wishing to, or authorized to, execute applications with low processing requirements, such as an electronic mail program or web browser, may be associated with a virtual desktop instance provisioned with only low processing power capabilities (e.g., 1 or 2 CPU cores and 1 gigabyte of RAM) and only such applications. That is, the user profile may indicate that the user is to be allocated a "small" instance or the user profile may indicate that the user is to be initially assigned a "small" instance that can dynamically grow based on how the user is using the instance. In contrast, a user of a client computing device wishing to, or authorized to, execute applications with higher processing requirements, such as professional drafting or photo editing applications, may be associated with a different virtual desktop instance provisioned with high processing power capabilities (e.g., 4 or 8 CPU cores and 16 gigabytes of RAM) and such applications. Similarly, the user profile may indicate that the user is to be initially allocated a "premium" instance that may shrink based on how the user is using it. The processing requirements associated with a user or a client computing device may be determined based on a variety of factors. The determination may be based on a user request at launching of the remote computing application. The determination may also be based on pre-selected options for certain users as indicated in data transmitted when the remote computing application is launched.

Once the PES platform 102 determines the processing requirements needed for the client computing device request, then, at block 1006, the remote computing session is established between the virtual desktop instance and the client computing device. Subsequent to establishing the session, the instance may be dynamically adjusted based on monitoring the use of the instance by the user of the client computing device at block 1008.

For example, the initial virtual desktop instance may be provisioned with low resources, based on the user profile. However, after some time, the user may request access to a virtual desktop instance with more resources to perform a specific task, such as to work on a database. In some embodiments, the request for the different requirement may be initiated by the user's selection of an icon for an application on the desktop interface. In some embodiments, the request may be initiated by the user's selection of an option from a list of options in a control panel. For example, the list of options may include a sliding scale of different amounts of processing power and memory.

The PES platform 102 may dynamically adjust the amount of resource allocated to the virtual desktop instance to accommodate more processing power and memory. In some embodiments, the adjustment may require re-launching the instance on the same or a different data center computer. The re-launching of a virtual desktop instance may include terminating the running instance, de-associating the desktop store from the instance, selecting a data center computer to launch the new instance, instantiating the new instance on the selected data center computer, and associating the desktop store to the new instance. Once the instance is instantiated, the user may be provided access to it by a login prompt.

In other embodiments, the adjustment may include adding additional resource to the virtual desktop instance without termination of the instance. For example, the instance manager could add another processor to the virtual desktop instance, add memory to the virtual desktop instance, etc. The routine 1000 ends at block 1010.

FIG. 11 is a flow diagram illustrative of a routine for the transition of operation of the client computing device and the service provider between remote and local environments. The routine starts at 1102. At block 1104, a remote computing session is established between a virtual desktop instance and a client computing device. The session may be established based on a user profile associated with the user of the client computing device, as described above. Additionally, a desktop store is associated with the user's instance. After the session is established, the PES platform 102 stores data created by the user's interaction with the instance on the client computing device at block 1106 on the desktop store. Then, at decision block 1108, the PES platform 102 determines whether a network connection loss is planned between the client computing device and the PES platform 102. For example, the user of the client computing device may be in preparation of boarding an airplane, and the user may indicate the imminent network disconnection.

While no such disconnection is anticipated, the PES platform 102 continues to receive data from interaction of the user at the client computing device and stores the data at block 1106. However, if at block 1108, the PES platform 102 determines that the network connection is planned on being lost, then the routine moves to block 1110, and the PES platform 102 replicates a copy of the image used to generate a virtual desktop instance (e.g., an image of an OS and installed applications) onto the client computing device, and also replicates a copy of the desktop store onto the client computing device. In some embodiments, it may require a significant amount of time to replicate the image used to instantiate the virtual desktop instance. Thus, the user may have to plan accordingly. In alternative embodiments, the client computing device can be provisioned with an image used to generate a virtual desktop instance or receive a copy of the image sometime before when the user will need to enter a disconnected mode. In this embodiment, when the PES platform 102 determines that the network connection will be lost, the PES platform 102 can cause the desktop store to be sent to the client computing device. Here, the PES platform 102 may not have to send everything in the desktop store to the client computing device; rather the PES platform 102 can send the changes since the last time the PES platform 102 synchronized with the client computing device. For example, a local instance manager can maintain a timestamp indicating the last time a change was made as well as a change log indicating what blocks have changed in a local desktop store and the PES platform 102 can maintain a timestamp and change log for the desktop store. The PES platform 102 and local instance manager can determine the differences and synchronize. In an alternative embodiment, the change log can be maintained at a file system level, instead of at a block level. For example, an agent in the instance can keep track of the changes. In this configuration changed files and settings can be synchronized instead of blocks. In some embodiments, the client computing device may be adapted with a lower-powered, less energy intensive version of the instance executed on the data center computer.

Thereafter, when the client computing device 106 is disconnected from the network 104, the user may run a local virtual desktop instance from the locally stored image and attach the local data store. Here, changes to the desktop profile and the user content are stored on the local copy of the desktop store. Then, when a network connection is re-established with the PES platform 102, such as for example, when the user of the client computing device 106 returns to an area with network connectivity to the service provider's network (for example, gets off the airplane at its destination city), a remote computing session request is received from the client computing device and the local desktop store is synchronized with the desktop store, as shown by block 1112. In a specific example, the synchronization operation could occur when the user attempts to start a virtual desktop instance in the PES platform 102. When the client computing device 106 is connected to the PES platform 102, the copy of the desktop store 170 is saved to a storage server 107 of the PES platform 102. Changes made to the copy of the desktop store 170 are synchronized to the primary desktop store 1400 associated with the user, and further changes received from the user while interacting with the virtual instance in the remote session are also saved to the primary desktop store 170. The routine 1100 ends at block 1114.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable medium, may be stored in any number of computer executable components such as a CD-ROM, DVD-ROM, or provided or obtained via a network interface; further, components and/or data can be included in a single device or distributed in any other manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more computers of a Program Execution Service (PES) including processors and memory, the memory including instructions that, upon execution, cause the one or more computers to at least:
   establish a first computing session via a network between one of the one or more computers of the PES and a computing device, the computing device associated with a hard drive image that includes an operating system executing one or more applications;
   replicate the hard drive image onto a first desktop store of the PES;
   determine a change replication schedule based at least in part on an available network bandwidth between the computing device and the PES, wherein the available network bandwidth varies during the first computing session;
   schedule replication of changes to the hard drive image onto the first desktop store of the PES in accordance with the change replication schedule;
   receive a request to access a virtual desktop instance on the PES;
   in response to the request, establish a second computing session to provide access to a virtual desktop instance configured according to the replicated hard drive image and changes to the hard drive image on the first desktop store;
   synchronize the hard drive image with the replicated hard drive image on the first desktop store;
   transfer execution of the virtual desktop instance to a desktop instance on the computing device;
   detect an event associated with the virtual desktop instance; and
   responsive to the detected event, suspend replication of changes, wherein suspending replication comprises an interruption of the change replication schedule.

2. The system of claim 1, wherein the instructions, upon execution, further cause the one or more computers to transfer data in the first desktop store to a second desktop store on a periodic basis.

3. The system of claim 2, wherein the virtual desktop instance is configured according to the replicated hard drive image and the changes to the hard drive image on the second desktop store.

4. The system of claim 2, wherein the instructions, upon execution, further cause the one or more computers to detect an event associated with the first desktop store and to cause the virtual desktop instance to be detached from the first desktop store and to be attached to the second desktop store.

5. The system of claim 1, wherein the available network bandwidth is below a threshold, and wherein the change replication schedule comprises replicating the changes to the hard drive image onto the first desktop store periodically.

6. A computer-implemented method comprising:
   interacting, at a first client device, with a local computing environment;
   initiating, at the first client device, a first computing session with a Program Execution Service (PES);
   providing, to the PES, access to a copy of at least a portion of the local computing environment through the first computing session, wherein providing access to the copy is in accordance with a change replication schedule, and wherein the change replication schedule is determined based at least in part on an available network bandwidth that varies during the first computing session;
   initiating a second computing session with the PES;
   accessing a virtual desktop instance executed by the PES;
   interacting with a copy of the local computing environment though the virtual desktop instance;
   suspending access to the copy of the at least a portion of the local computing environment, wherein suspending access to the copy comprises an interruption of the change replication schedule; and
   replicating changes to the copy of the local computing environment onto the local computing environment.

7. The computer-implemented method of claim 6, wherein the local computing environment comprises an image of an operating system and user data.

8. The computer-implemented method of claim 6, wherein initiating a second computing session comprises initiating the second computing session from the first client device.

9. The computer-implemented method of claim 6, further comprising monitoring the first client device for detection of an event, wherein the event comprises one or more of a power outage, a disconnection of a network connection between the first client device and the PES, a software failure on the first client device, or a hardware failure on the first client device.

10. The computer-implemented method of claim 9, wherein initiating a second computing session comprises initiating the second computing session from a second client device.

11. The computer-implemented method of claim 6, wherein the virtual desktop instance executed by the PES is configured according to the copy of the local computing environment.

12. The computer-implemented method of claim 9, wherein monitoring the first client device for detection of an event is performed by an agent installed on the first client device.

13. The computer-implemented method of claim 6 further comprising providing, to the PES, access to a copy of the local computing environment through the second computing session.

14. Non-transitory physical computer storage comprising computer-executable instructions that, upon execution, direct a computing system to at least:
   establish a computing session between one or more physical computing systems at a Program Execution Service (PES) and a computing device, the computing device comprising a local computing environment, wherein the computing device is associated with a user;
   replicate, on a storage server of the PES, the local computing environment, wherein the local computing environment is associated with the user through a user identifier;
   receive changes to the local computing environment;
   replicate the changes to the local computing environment on the storage server of the PES in accordance with a change replication schedule, wherein the change replication schedule is based at least in part on variations in available network bandwidth;
   receive a request to access a virtual desktop instance;
   configure a virtual desktop instance in response to the request;
   provide, in response to the request, access to a virtual desktop instance configured in accordance with the replicated local computing environment and changes to the local computing environment;
   detect an event associated with the virtual desktop instance;
   responsive to the detected event, suspend replication of changes to the local computing environment, wherein suspending replication comprises an interruption of the change replication schedule; and
   replicate changes to the storage server of the PES to the local computing environment.

15. The non-transitory physical computer storage of claim 14, wherein the computer-executable instructions, upon execution, direct the computing system to replicate the local computing environment on a storage server of the PES.

16. The non-transitory physical computer storage of claim 14, wherein the computer-executable instructions, upon execution, further direct the computing system to replicate the local computing environment on an additional storage server of the PES.

17. The non-transitory physical computer storage of claim 16, wherein the computer-executable instructions, upon execution, direct the computing system to configure the virtual desktop instance in accordance with the replicated local computing environment on the additional storage server of the PES.

18. The non-transitory physical computer storage of claim 14, wherein the computer-executable instructions, upon execution, direct the computing system to replicate the changes to the local computing environment periodically based on a frequency of the changes.

19. The system of claim 1, wherein the available network bandwidth is above a threshold, and wherein the change replication schedule comprises replicating the changes to the hard drive image onto the first desktop store based on a frequency of the changes.

20. The system of claim 1, wherein the instructions further cause the one or more computers to at least:
   determine an updated available network bandwidth between the computing device and the PES;
   determine an updated change replication schedule based at least in part on the updated available network bandwidth; and
   reschedule replication of changes to the hard drive image onto the first desktop store of the PES in accordance with the updated change replication schedule.

21. The system of claim 1, wherein the instructions further cause the one or more computers to at least:
   receive an indication that the computing device has reconnected to the network;

in response to the indication:
- synchronize the replicated hard drive image on the first desktop store with the hard drive image;
- transfer execution of the desktop instance on the computing device to the virtual desktop instance; and
- resume replication of changes in accordance with the change replication schedule.

22. The computer-implemented method of claim 6, further comprising:
- detecting, by the first client device, a reconnection of the network connection between the first client device and the PES; and
- in response to the reconnection of the network connection:
  - replicating changes to the local computing environment onto the copy of the local computing environment; and
  - resuming the providing of access to the copy of the at least a portion of the local computing environment in accordance with the change replication schedule.

23. The non-transitory physical computer storage of claim 14, wherein the computer-executable instructions, upon execution, further direct the computing system to:
- detect a reconnection of the network connection between the PES and the computing device; and
- in response to the reconnection of the network connection, resume replication of changes to the local computing environment in accordance with the change replication schedule.

* * * * *